(12) United States Patent
Gunaratna et al.

(10) Patent No.: US 12,626,693 B2
(45) Date of Patent: May 12, 2026

(54) MODELING ATTENTION TO IMPROVE CLASSIFICATION AND PROVIDE INHERENT EXPLAINABILITY

(71) Applicant: SAMSUNG ELECTRONICS CO., LTD., Suwon-si (KR)

(72) Inventors: Dalkandura Arachchige K.S.S. Gunaratna, San Jose, CA (US); Vijay Srinivasan, San Jose, CA (US); Hongxia Jin, San Jose, CA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 616 days.

(21) Appl. No.: 18/077,826

(22) Filed: Dec. 8, 2022

(65) Prior Publication Data

US 2023/0252982 A1     Aug. 10, 2023

Related U.S. Application Data

(60) Provisional application No. 63/307,592, filed on Feb. 7, 2022.

(51) Int. Cl.
| | |
|---|---|
| *G10L 15/22* | (2006.01) |
| *G10L 15/16* | (2006.01) |
| *G10L 15/18* | (2013.01) |
| *G06F 40/30* | (2020.01) |
| *G10L 15/183* | (2013.01) |

(52) U.S. Cl.
CPC .......... *G10L 15/1822* (2013.01); *G10L 15/16* (2013.01); *G10L 15/1815* (2013.01); *G10L 15/22* (2013.01); *G06F 40/30* (2020.01); *G10L*

*15/18* (2013.01); *G10L 15/183* (2013.01); *G10L 2015/221* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 11,281,857 B1 | 3/2022 | Craft et al. | |
| 11,593,560 B2 * | 2/2023 | Zhou | G06F 16/3344 |
| 11,593,631 B2 * | 2/2023 | Dalli | G06N 3/04 |

(Continued)

FOREIGN PATENT DOCUMENTS

| | | |
|---|---|---|
| CN | 111309915 A | 6/2020 |
| CN | 112632961 A | 4/2021 |

(Continued)

OTHER PUBLICATIONS

Chen et al., "BERT for Joint Intent Classification and Slot Filling", arXiv:1902.10909v1, Feb. 28, 2019, 7 total pages.

(Continued)

*Primary Examiner* — Richard Z Zhu
(74) *Attorney, Agent, or Firm* — Sughrue Mion, PLLC

(57) ABSTRACT

In an artificial intelligence model (AI model), input data is processed to provide both classification of the input data and a visualization of the process of the AI model. This is done by performing intent and slot classification of the input data, generating weights and binary classifier logits, performing feature fusion and classification. A graphical explanation is then output as a visualization along with logits.

17 Claims, 16 Drawing Sheets

(56) References Cited

U.S. PATENT DOCUMENTS

| | | | | |
|---|---|---|---|---|
| 2020/0043480 | A1 | 2/2020 | Shen et al. | |
| 2021/0183484 | A1* | 6/2021 | Shaib | G06F 40/295 |
| 2021/0217408 | A1* | 7/2021 | Hakkani-Tur | G06N 3/02 |
| 2022/0108688 | A1* | 4/2022 | Wang | G10L 15/063 |
| 2022/0171798 | A1* | 6/2022 | Wang | G06F 16/353 |
| 2022/0198254 | A1* | 6/2022 | Dalli | G06N 3/084 |
| 2022/0245326 | A1* | 8/2022 | Stabler | G06F 40/253 |
| 2023/0081598 | A1* | 3/2023 | Rizk | G06F 16/248 |
| | | | | 707/769 |
| 2023/0394317 | A1* | 12/2023 | Zhai | G06F 40/177 |
| 2024/0005654 | A1* | 1/2024 | Ray | G06T 11/001 |

FOREIGN PATENT DOCUMENTS

| | | | | | |
|---|---|---|---|---|---|
| EP | 3522037 | A1 * | 8/2019 | | G06F 17/277 |
| KR | 10-2281581 | B1 | 7/2021 | | |

OTHER PUBLICATIONS

International Search Report and Written Opinion (PCT/ISA/210 and PCT/ISA/237) dated May 8, 2023, issued by International Searching Authority for International Application No. PCT/KR2023/001659.

Libo Qin et al., "GL-GIN: Fast and Accurate Non-Autoregressive Model for Joint Multiple Intent Detection and Slot Filling", 11 pages, Jun. 3, 2021, arXiv:2106.01925v1 [cs.CL], XP081983541.

Momchil Hardalov et al., "Enriched Pre-trained Transformers for Joint Slot Filling and Intent Detection", 12 pages, Oct. 5, 2021, arXiv:2004.14848v2 [cs.CL], XP091064531.

Sarah Wiegreffe et al., "Attention is not not Explanation", 12 pages, Sep. 5, 2019, arXiv:1908.04626v2 [cs.CL], XP093215957.

Kalpa Gunaratna et al., "Explainable Slot Type Attentions to Improve Joint Intent Detection and Slot Filling", 13 pages, Oct. 19, 2022, arXiv:2210.10227v1 [cs.LG], XP091347979.

Communication issued on Nov. 7, 2024 from the European Patent Office for European Patent Application No. 23750000.4.

A. Kumar et al., "MA-DST: Multi-Attention-Based Scalable Dialog State Tracking", arXiv:2002.08898v1 [cs.CL], Association for the Advancement of Artificial Intelligence, www.aaai.org, Feb. 7, 2020, (9 total pages).

I. Shilin et al., "A Method for Dataset Creation for Dialogue State Classification in Voice Control Systems for the Internet of Things", ResearchGate, https://www.researchgate.net/publication/328513309, Oct. 2018, (9 pages total).

* cited by examiner 1-20

SYSTEM 1-10

RECEIVE AN UTTERANCE 1-22

DETERMINE MEANING OF UTTERANCE 1-23

OUTPUT MEANING OF UTTERANCE (IF IN ERROR, DIFFICULT TO DISCOVER ERROR MECHANISM) 1-24

1-1

SYSTEM 1-11

RECEIVE AN UTTERANCE 1-2

DETERMINE IMPORTANCE OF EACH WORD 1-3

OUTPUT VISUALIZATION OF IMPORTANCE OF EACH WORD (IF SOME WORDS IN ERROR, LOCATION OF ERROR IS APPARENT) 1-4

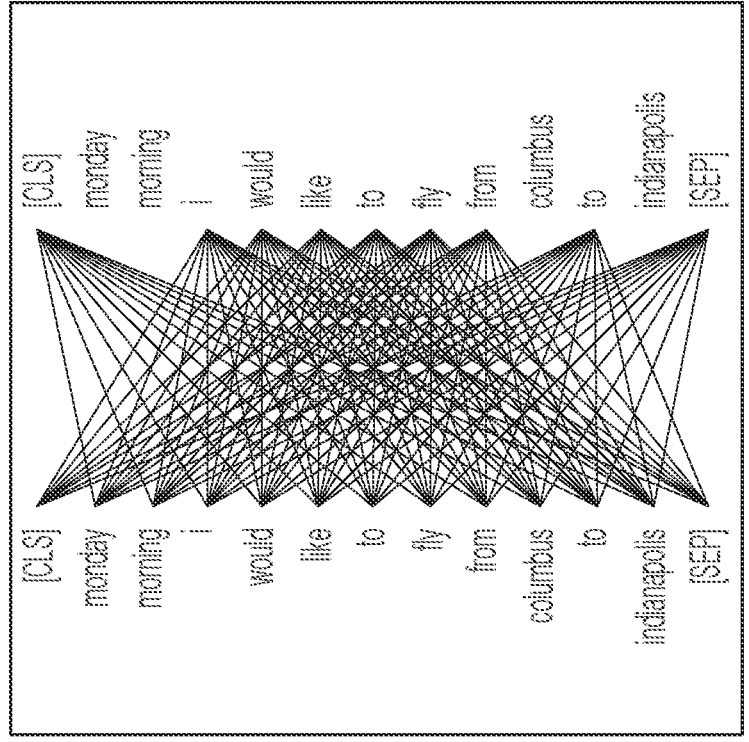
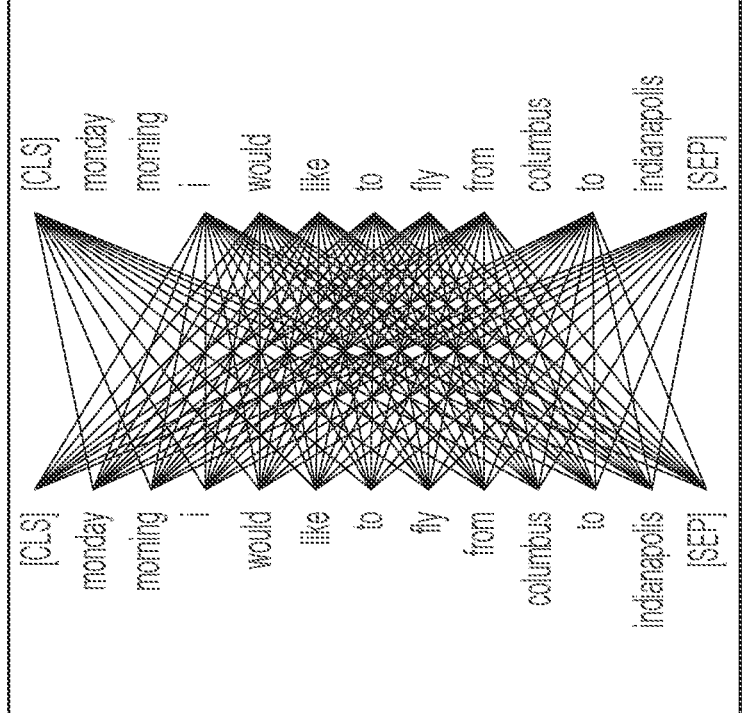
FIG. 2C

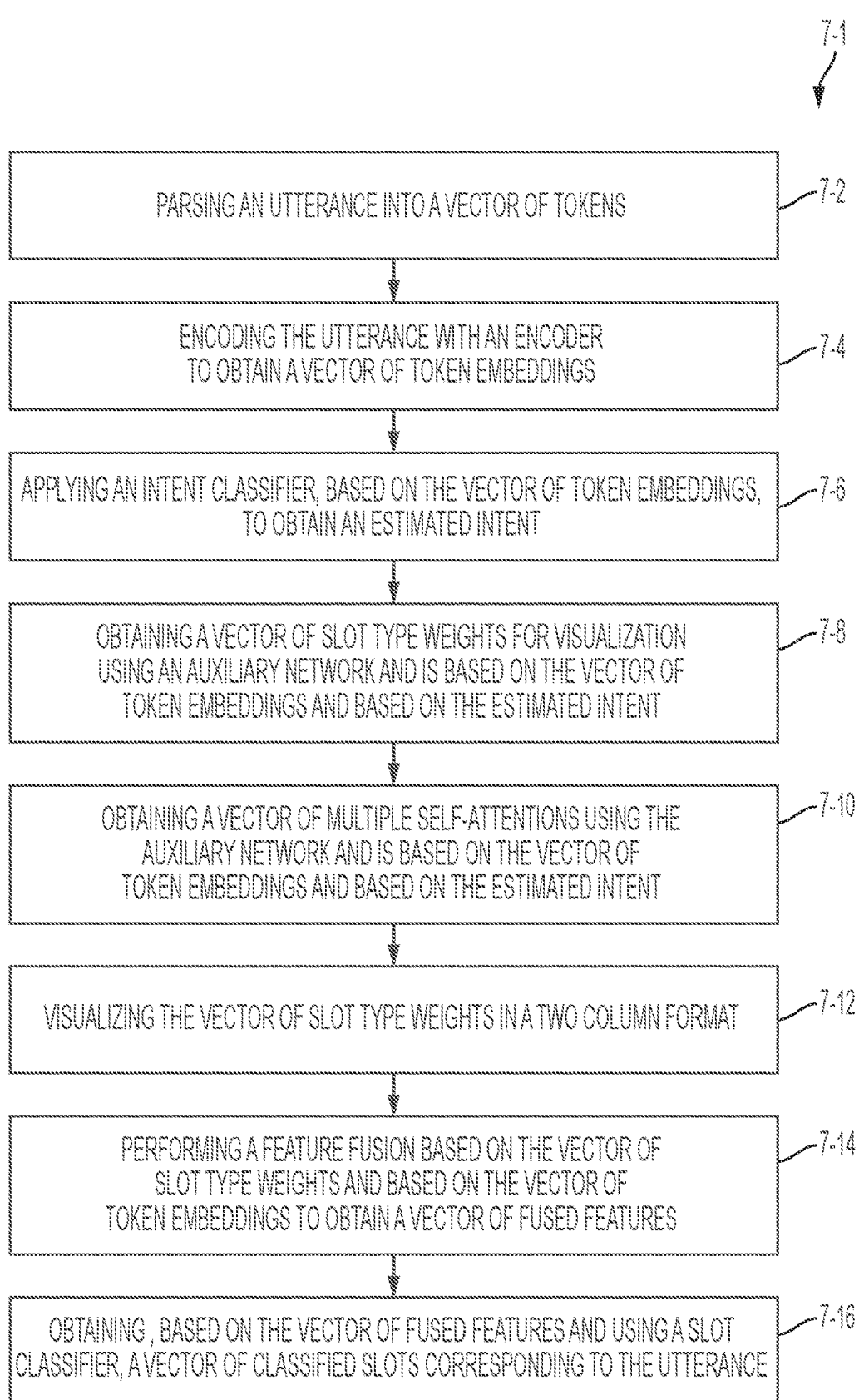

7-1

7-2 PARSING AN UTTERANCE INTO A VECTOR OF TOKENS 7-4 ENCODING THE UTTERANCE WITH AN ENCODER
TO OBTAIN A VECTOR OF TOKEN EMBEDDINGS 7-6 APPLYING AN INTENT CLASSIFIER, BASED ON THE VECTOR OF TOKEN EMBEDDINGS,
TO OBTAIN AN ESTIMATED INTENT 7-8 OBTAINING A VECTOR OF SLOT TYPE WEIGHTS FOR VISUALIZATION
USING AN AUXILIARY NETWORK AND IS BASED ON THE VECTOR OF
TOKEN EMBEDDINGS AND BASED ON THE ESTIMATED INTENT 7-10 OBTAINING A VECTOR OF MULTIPLE SELF-ATTENTIONS USING THE
AUXILIARY NETWORK AND IS BASED ON THE VECTOR OF
TOKEN EMBEDDINGS AND BASED ON THE ESTIMATED INTENT 7-12 VISUALIZING THE VECTOR OF SLOT TYPE WEIGHTS IN A TWO COLUMN FORMAT 7-14 PERFORMING A FEATURE FUSION BASED ON THE VECTOR OF
SLOT TYPE WEIGHTS AND BASED ON THE VECTOR OF
TOKEN EMBEDDINGS TO OBTAIN A VECTOR OF FUSED FEATURES 7-16 OBTAINING, BASED ON THE VECTOR OF FUSED FEATURES AND USING A SLOT
CLASSIFIER, A VECTOR OF CLASSIFIED SLOTS CORRESPONDING TO THE UTTERANCE

FIG. 7

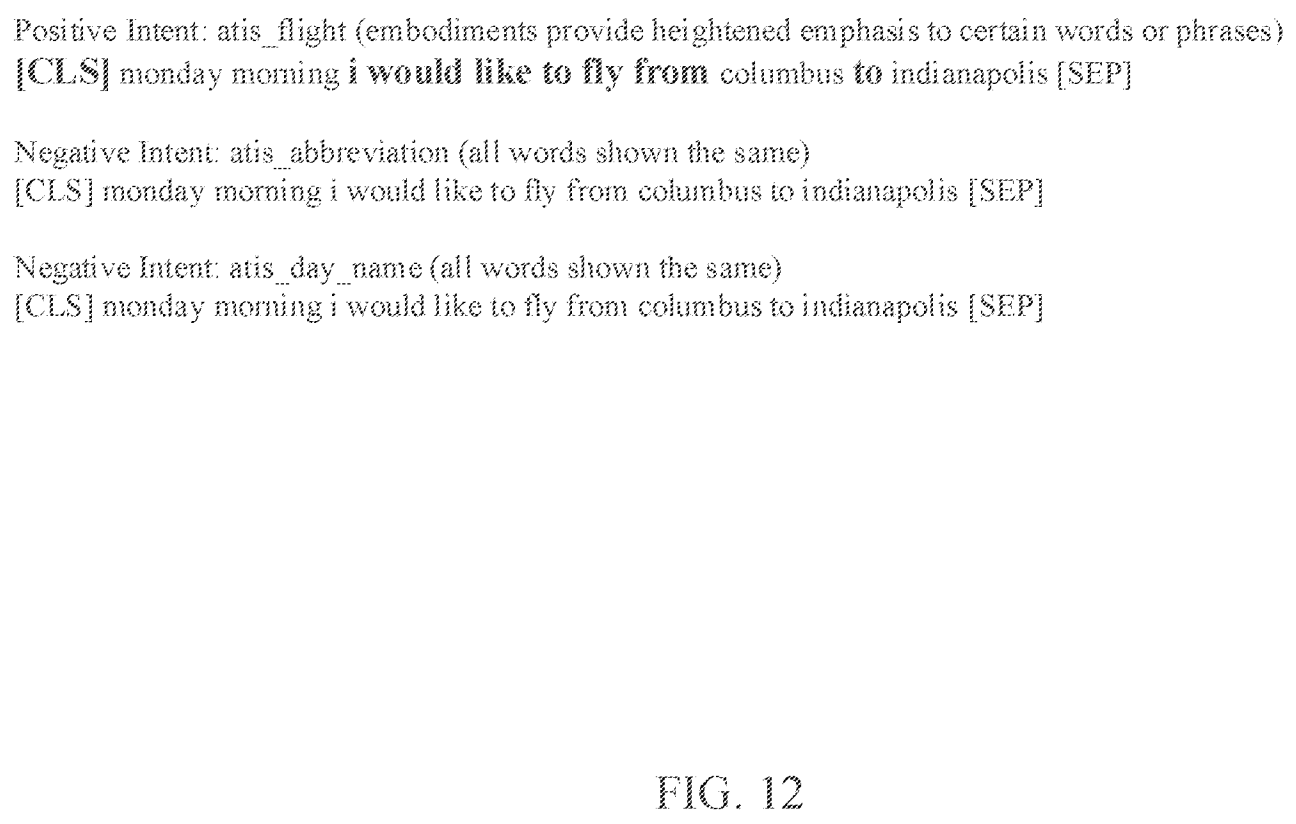

Positive Intent: atis_flight (embodiments provide heightened emphasis to certain words or phrases)
[CLS] monday morning i would like to fly from columbus to indianapolis [SEP]

Negative Intent: atis_abbreviation (all words shown the same)
[CLS] monday morning i would like to fly from columbus to indianapolis [SEP]

Negative Intent: atis_day_name (all words shown the same)
[CLS] monday morning i would like to fly from columbus to indianapolis [SEP]

FIG. 12

MODELING ATTENTION TO IMPROVE CLASSIFICATION AND PROVIDE INHERENT EXPLAINABILITY

CROSS REFERENCE TO RELATED APPLICATION

This application claims benefit of priority of U.S. Provisional Application No. 63/307,592 filed Feb. 7, 2022, the contents of which are hereby incorporated by reference.

FIELD

The present disclosure is related to artificial intelligence performing classification of input data.

BACKGROUND

The present application relates to classification of input data. In an example, the present application discusses joint intent detection and slot filling for natural language understanding (NLU). Existing systems learn features collectively over all slot types (i.e., labels) and have no way to explain the model. A lack of explainability creates doubt in a user as to what a model is doing. A lack of explainability also makes improving the model difficult when errors occur. Adding explainability by an additional process unrelated to intent detection and slot filling reduces efficiency and correctness of explanations.

SUMMARY

Embodiments provided herein provide classification (inference of mapping input data to one particular class from a set of classes or mapping input data to soft values, one soft value for each class of the set of classes) and explainability (visual outputs that explain how an AI model arrived at a classification).

In an artificial intelligence model (AI model) of embodiments provided herein, an utterance is processed to provide both classification of the utterance and a visualization of the process of the AI model. This is done by performing intent classification of the utterance, generating slot type weights and binary classifier logits, performing feature fusion and slot classification. A graphical slot explanation is then output as a visualization along with slot logits. Based on the output, voice-activated AI-based personal assistant can take action on the input utterance. Also, a debugging engineer is assisted by the visualization in a task of improving the AI model.

Provided herein is a method of visualizing a natural language understanding model, the method including: parsing an utterance into a vector of tokens; encoding the utterance with an encoder to obtain a vector of token embeddings; applying an intent classifier, based on the vector of token embeddings, to obtain an estimated intent; obtaining a vector of slot type weights for visualization. The obtaining the vector of slot type weights uses an auxiliary network and is based on the vector of token embeddings and based on the estimated intent; obtaining a vector of multiple self-attentions. The obtaining the vector of multiple self-attentions uses the auxiliary network and is based on the vector of token embeddings and based on the estimated intent; the method includes visualizing the vector of slot type weights in a two column format. The two column format comprises a first column and a second column; the method includes performing a feature fusion based on the vector of slot type weights and based on the vector of token embeddings to obtain a vector of fused features; and obtaining, based on the vector of fused features and using a slot classifier, a vector of classified slots corresponding to the utterance.

Also provided herein is a server for utterance recognition and model visualization, the server including: one or more processors; and one or more memories, the one or more memories storing a program, wherein execution of the program by the one or more processors is configured to cause the server to at least: parse an utterance into a vector of tokens; encode the utterance with an encoder to obtain a vector of token embeddings; apply an intent classifier, based on the vector of token embeddings, to obtain an estimated intent; obtain a vector of slot type weights for visualization, wherein the obtaining the vector of slot type weights uses an auxiliary network and is based on the vector of token embeddings and based on the estimated intent; obtain a vector of multiple self-attentions, wherein the obtaining the vector of multiple self-attentions uses the auxiliary network and is based on the vector of token embeddings and based on the estimated intent; visualize the vector of slot type weights in a two column format, wherein the two column format comprises a first column and a second column; perform a feature fusion based on the vector of slot type weights and based on the vector of token embeddings to obtain a vector of fused features; and obtain, based on the vector of fused features and using a slot classifier, a vector of classified slots corresponding to the utterance.

Also provided herein is a non-transitory computer readable medium configured to store a program for utterance recognition and model visualization, wherein execution of the program by one or more processors of a server is configured to cause the server to at least: parse an utterance into a vector of tokens; encode the utterance with an encoder to obtain a vector of token embeddings; apply an intent classifier, based on the vector of token embeddings, to obtain an estimated intent; obtain a vector of slot type weights for visualization, wherein the obtaining the vector of slot type weights uses an auxiliary network and is based on the vector of token embeddings and based on the estimated intent; obtain a vector of multiple self-attentions, wherein the obtaining the vector of multiple self-attentions uses the auxiliary network and is based on the vector of token embeddings and based on the estimated intent; visualize the vector of slot type weights in a two column format, wherein the two column format comprises a first column and a second column; perform a feature fusion based on the vector of slot type weights and based on the vector of token embeddings to obtain a vector of fused features; and obtain, based on the vector of fused features and using a slot classifier, a vector of classified slots corresponding to the utterance.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

FIG. 2C illustrates an example utterance and attentions calculated for all tokens of the utterance for two slot types, when the two slot types are not present in the utterance, according to some embodiments.

FIG. 7 illustrates a detailed-level logic flow for utterance recognition and model visualization, according to some embodiments.

FIG. 12 illustrates an example of visualizing intent, according to some embodiments.

DETAILED DESCRIPTION

Embodiments can be applied to any classification task to provide inherent explainability (no need of post-hoc techniques) to an existing classification method.

In one example, explainability is added to a joint intent detection and slot filling task related to natural language understanding (NLU). For example, a joint NLU model can include explainability in intent detection. Intent detection can be considered similar to document classification, paragraph/sentence classification where model classifies the entire input into one of candidate class labels.

Some examples also include adding an explainable component to the slot filling task. Embodiments improve model accuracy in addition to providing explanations for the slot filling task.

Slot filling is similar to other applications such as named entity recognition (NER), part-of-speech (POS) tagging, information extraction (IE). Therefore, embodiments provided herein are applicable to applications similar to slot filling where each word/token in an input has to be classified into one of the candidate class labels.

Figures 1A, 1B:
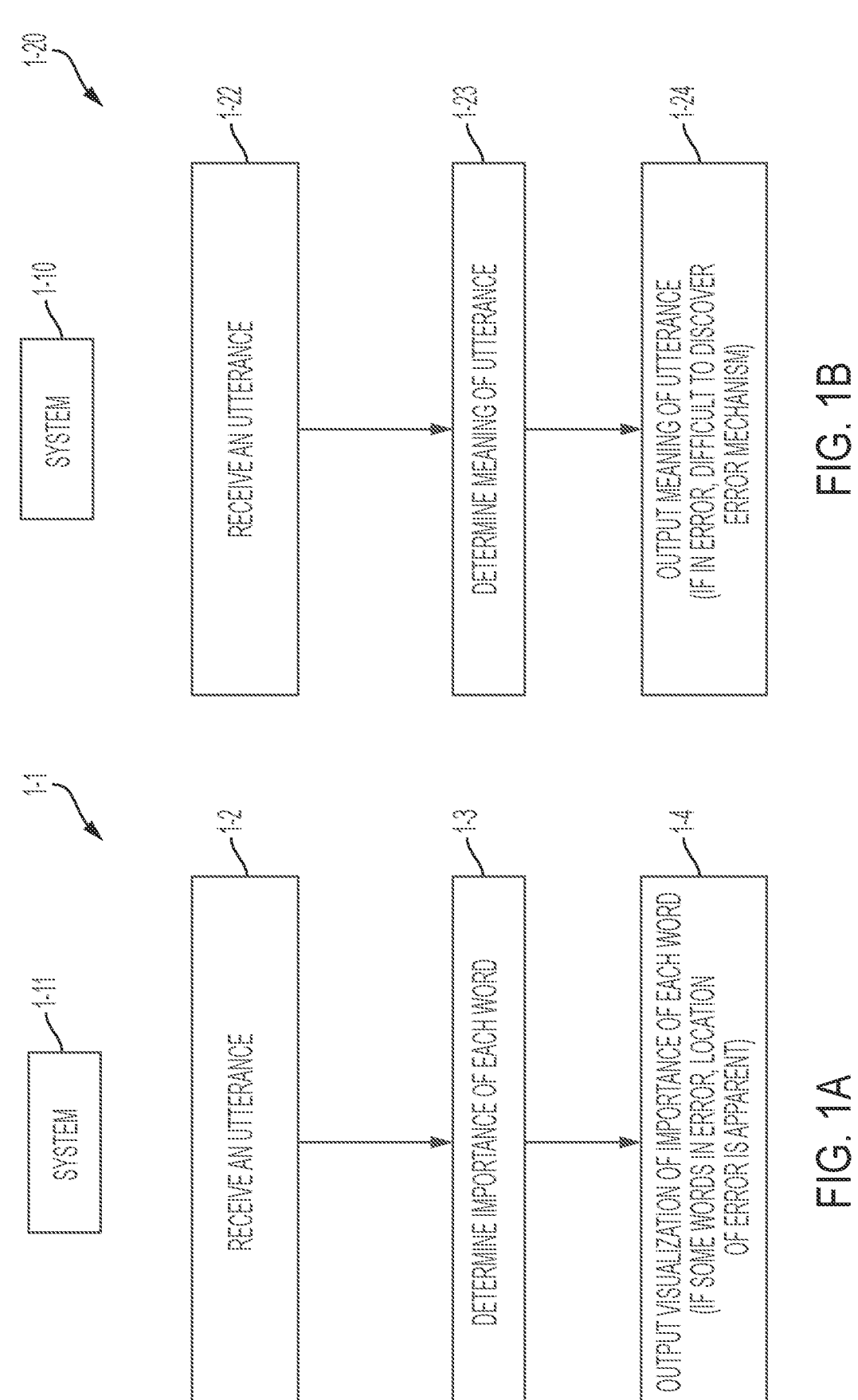
FIG. 1A illustrates an example of determining importance of each word for a natural language model, according to some embodiments.
FIG. 1B illustrates a comparative example of an utterance and determining, as a whole, the meaning of the utterance.

FIG. 1A illustrates logic 1-1 for determining the importance of each word in an utterance and providing a visualization. At operation 1-2 an utterance is received. At operation 1-3, an importance of each word in the utterance is determined. At operation 1-4, a visualization is provided showing the importance of each word. As an example, the utterance may be "Find a flight from Los Angeles to New York" to be processed by a natural language model ("system 1-11," also see FIG. 3), according to an example embodiment. In this example, an AI personal assistant needs to determine what it is the user wants to do. This step is called intent detection. Along with intent detection, the AI personal assistant needs to fill in slots in the utterance (i.e., identify and extract important entities/noun phrases in the utterance). Joint intent detection and slot filling means that both tasks are performed at the same time. The utterance is parsed into tokens. In general, a token is a word or a part of a word. A variable called attention indicates which tokens are important. For example, the self attention mechanism of BERT includes variables Query (Q), Key (K), and Value (V). Q, K and V may be used in a linear transformation to generate weights for different connections. The weights may be fed into a scaling dot product.

In embodiments provided herein, attention is found for each slot type of the natural language model. See the slot type attention module 3-3 in auxiliary network 3-10 of FIG. 3. This makes it possible to visualize performance of the system 1-11 at the slot level (see FIGS. 2A-2C). Also, please see FIG. 8B in which debugging is improved based on the visualization.

FIG. 1B illustrates a comparative example. In FIG. 1B, a system 1-10 (not an embodiment) using a logic 1-20 receives an utterance at operation 1-22 and attempts to determine the meaning of the utterance as a whole at operation 1-23. System 1-20 then outputs the estimated meaning at operation 1-24. If there is an error in the meaning found by system 1-10, it is difficult to discover the error mechanism because the estimated meaning may have no humanly-visible relation to the utterance at each token level for each slot type. In system 1-10 there are no slot type attentions, rather attention is calculated collectively for all slot types by a system 1-10 (not an embodiment). Processing the utterance, in the comparative example of system 1-10 (not an embodiment), attention is found in a collective manner for all the slot types. There is limited information in FIG. 1B, and observing FIG. 1B is of limited use, that is, it is difficult to improve the model of system 1-10 if there is an error in the model. Also see FIG. 8A.

Figure 2A:
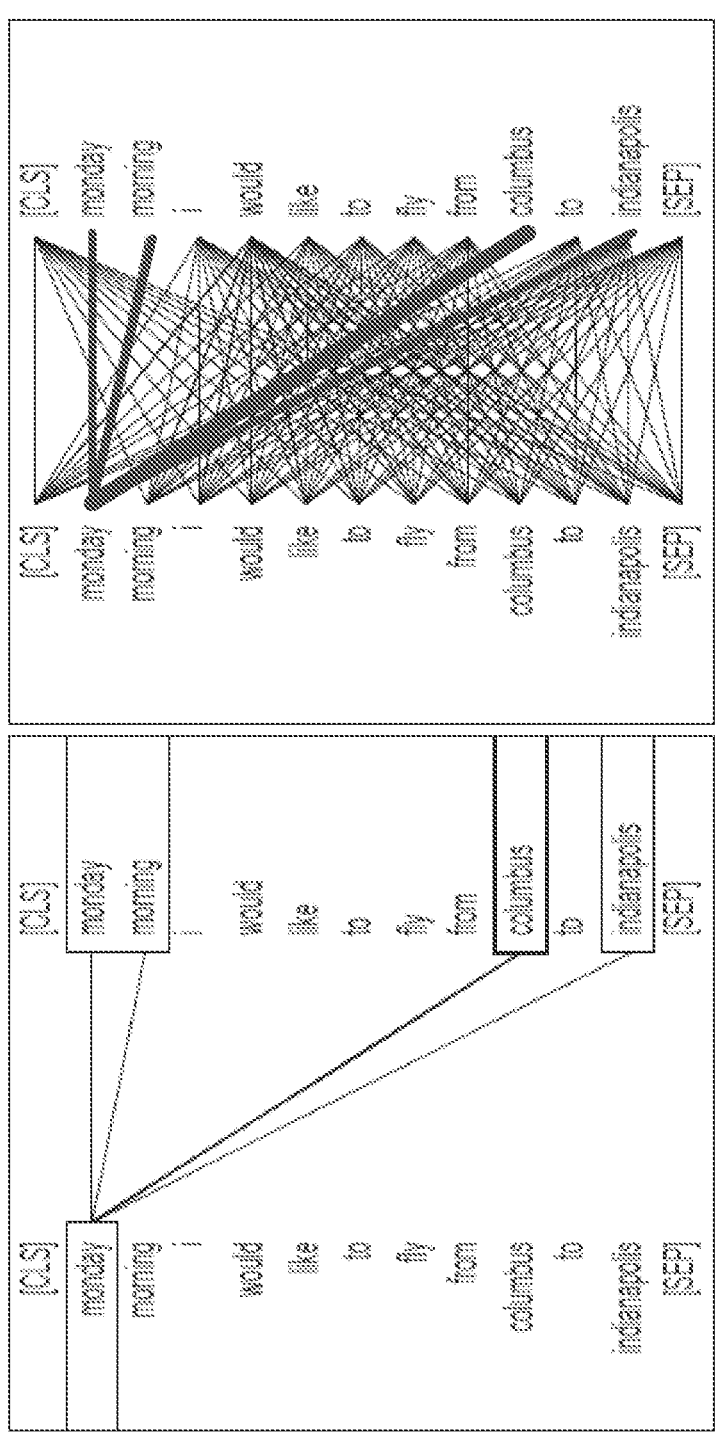
FIG. 2A illustrates an example utterance and attentions calculated for one token, "monday," of the utterance, and attentions computed for all tokens of the utterance, for the slot type "depart_date.day_name" which is also positively present in the utterance, according to some embodiments.

FIG. 2A illustrates an example two column format for visualization. An example utterance is "Monday morning I would like to fly from Columbus to Indianapolis." Slots to consider are, for example, from the set {(depart_date.day_name:Monday), (depart_time.period_of_day: morning), (fromloc.city_name:Columbus), (toloc.city_name:Indianapolis)}. The illustration of FIG. 2A is referred to as a positive slot for the slot type "depart_date.day_name." It is positive because the departure date day name, Monday (value of the slot type "depart_date.day_name"), is present in the utterance. The left hand portion of FIG. 2A is for attentions computed for token 'Monday.' The right hand portion of FIG. 2A is for attentions computed for all tokens for the same slot type.

In FIG. 2A, embodiments provide the intensity values shown as a line or bar connecting a token in a first column with a token in a second column. For example, for the token "Monday" of the utterance as shown in the left hand portion of FIG. 2A, Monday has significant attention for the following other tokens in the utterance: "morning," "Columbus," and "Indianapolis." The system 1-11 is recognizing that those particular other tokens are linked in meaning with Monday (semantically linked). Thus, the importance of the first word for the slot type "depart_date.day_name" is apparent from the visualization of FIG. 2A. Along with the intensity of the line or bar coming from the first word, words which are important in relation to the first word of the first column are shown by where that bar connects in the second column.

That is, as shown in FIG. 2A, visualizing the vector of slot type weights includes providing a visual presentation including the first column (with elements being the tokens and also the delimiters CLS and SEP) and the second column (again with elements being the tokens and also the delimiters CLS and SEP) with lines or bars connecting column entries from the first column to the second column (for example the line from Monday to Columbus). That is, the first column and the second column both list the vector of tokens and when selecting a token from the left column, it uses the attention weights computed on the entire utterance with respect to the token for the already selected slot type to visualize the importance of utterance tokens on the right column. Also, a first bar corresponds to a correspondence between a first token in the first column with a second token in the second column (such as Monday to Columbus). The presentation of FIG. 2A permits a person to recognize, based on the importance shown by the intensities of the bars and the termination points of the bars of the second column, the vector of classified slots obtained by the natural language understanding model, system 1-11. An emphasis (weight, darkness or thickness) of the line may indicate the strength of the intensity.

As mentioned above, the right hand portion of FIG. 2A shows attentions computed for all tokens for the slot type "depart_date.day_name".

Figure 2B:
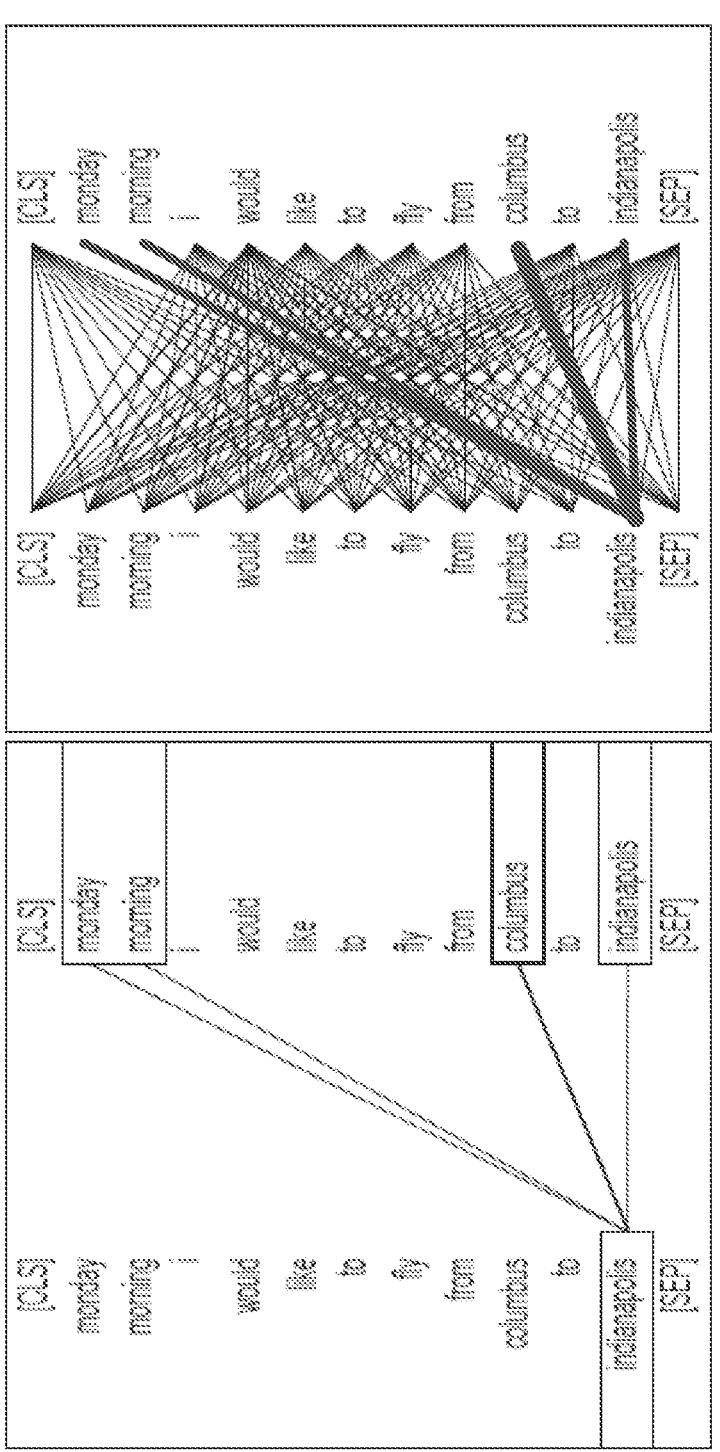
FIG. 2B illustrates an example utterance and attentions calculated for one token, "indianapolis," of the utterance, and attentions computed for all tokens of the utterance, for the slot type "toloc.city_name" which is also positively present in the utterance, according to some embodiments.

FIG. 2B illustrates attention for the specific slot type of "toloc.city_name." The utterance is the same as for FIG. 2A. The user wishes to find a flight to Indianapolis, and the attentions for the token "Indianapolis" for its slot classification are shown in the left portion of FIG. 2B. The attention between Indianapolis and Columbus is strong, as expected since the user wishes to fly from Columbus to Indianapolis (captures the pattern of a such utterance). The right hand portion of FIG. 2B illustrates attentions computed for all tokens with respect to this specific slot type.

FIG. 2C illustrates the two column format visualization for two slot types which are not present in the utterance: city_name and airport_name. Because the slot types are not present in the utterance, it is referred to as a negative slot for this utterance. The left hand portion is for slot_type: city_name. The right hand portion is for slot_type: airport_name. The utterance is the same as in FIG. 2A. There are no visible highlights in attention. Visualization such as FIG. 2C is also helpful in debugging because the visualization confirms that the system 1-11, as an example for this utterance, is not associating importance with these specific slot types. In FIG. 2C, attentions are computed for all tokens. These slot types are not present in utterance (negative) and hence no visible highlights in attention. For example, in the two negative slots of FIG. 2C, there are not any attention spikes, the attentions between tokens are uniform.

Figure 3:
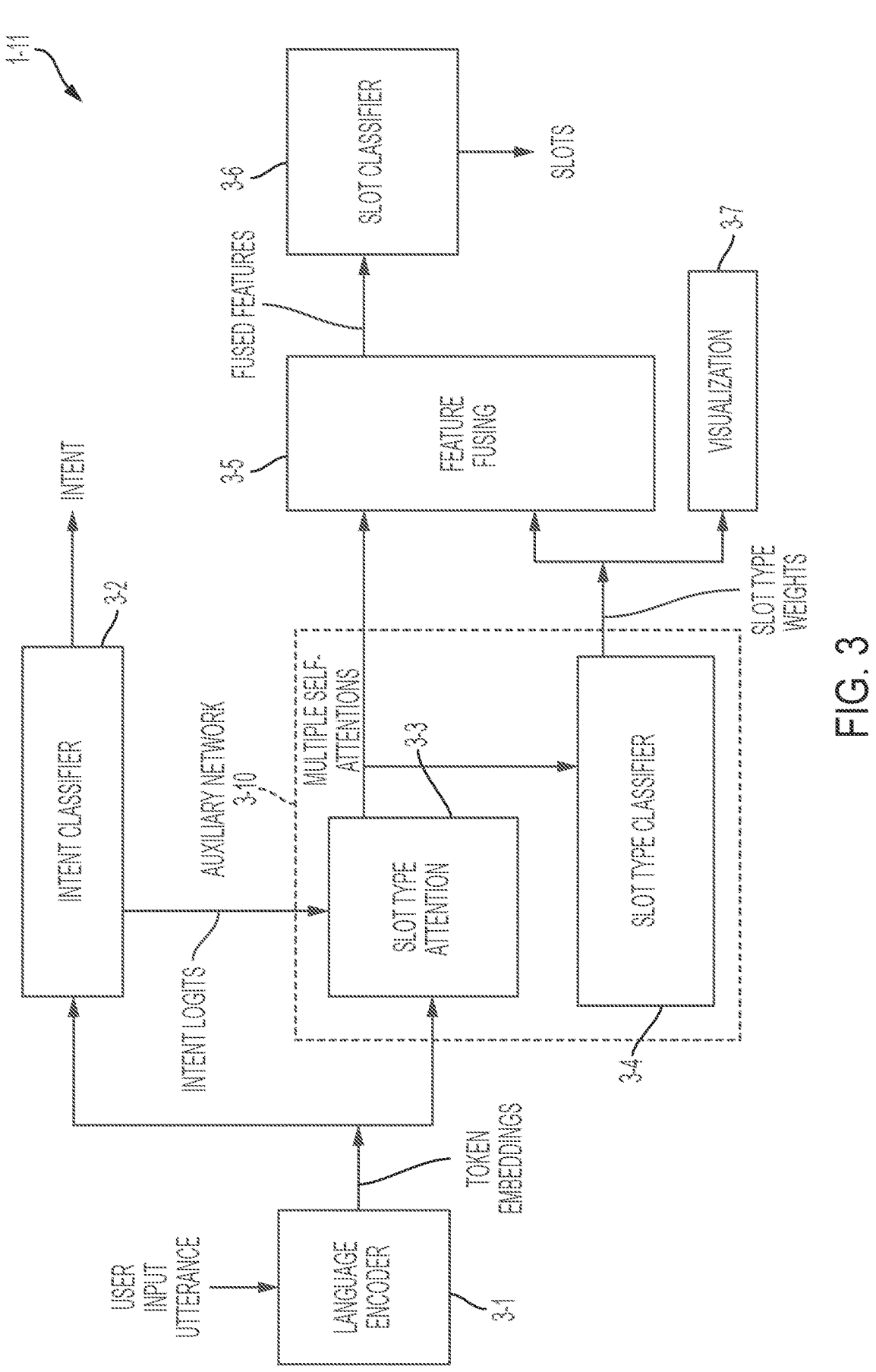
FIG. 3 illustrates a high-level block diagram for utterance recognition and model visualization, according to some embodiments.

FIG. 3 illustrates a system 1-11 for utterance recognition and model visualization.

In FIG. 3, language encoder 3-1 receives a user input utterance and performs parsing the utterance into a vector of tokens.

Language encoder 3-1 also performs encoding the utterance with an encoder to obtain a vector of token embeddings.

Intent classifier 3-2 performs applying an intent classifier, based on the vector of token embeddings, to obtain an estimated intent. Intent classifier 3-2 also provides intent logits.

In an example, intent classifier 3-2 is a single layer multi-class classifier that uses BERT as the language encoder 3-1. For a given utterance u, the embedding vector is the context embedding $u^c \in R^d$. The intent classifier 3-2 outputs intent logits $g^{intent}$ as shown in Eq. 1.

$$g^{intent} = u^c W^{intent} + b^{intent} \qquad \text{Eq. 1}$$

where $W^{intent} \in R^{d \times |I^{label}|}$ is a learnable weight matrix and $b^{intent}$ is a bias, and "x" is the multiplication sign in the exponent of R. $I^{label}$ the set of intent labels for the problem. Final intent for the utterance is obtained by applying argmax to the intent logits. An intent loss $L^{intent}$ is computed using a cross entropy loss function. $Y_x^{intent}$ is a truth label (one-hot encoded using 0 or 1) and $p_x \in$ softmax($g^{intent}$) is the softmax probability for the $x^{th}$ class, see Eq. 2.

$$L^{intent} = -\sum_x^{|I^{label}|} Y_x^{intent} \log(p_x) \qquad \text{Eq. 2}$$

Auxiliary network 3-10 allows system 1-11 to learn explainable weights and general, yet slot-specific, features. Auxiliary network 3-10 includes a slot type attention module 3-3 and a slot type classifier 3-4. Auxiliary network 3-10 performs obtaining a vector of multiple self-attentions. The auxiliary network 3-10 performs obtaining the vector of multiple self-attentions based on the vector of token embeddings and based on the intent logits. Embodiments apply self attention for each slot type and have a binary classifier for each slot type.

Dropout is used in randomly selecting (or not retaining) data for processing in FIG. 3. Dropout refers to ignoring units (i.e. neurons) during the training phase of a certain set of neurons which are chosen at random.

After applying dropout to the encoded utterance $u^e$, the intent logits $g^{intent}$ are concatenated with $u^e$. Because $g^{intent} \in R^{|I^{label}|}$, this concentration expands the logits vector by one dimension. An expanded logits vector is obtained by copying the logits l times (utterance length). The expanded intent logits vector is a tensor $g^{int\_e} \in R^{l \times |I^{label}|}$. Learning of any correlations between intents and slots is obtained by forming data as a concatenation of intent logits with token embeddings and then applying self attention. This is a direct fusion of intent features with the slot label classification network. The new feature $u^{sa} \in R^{l \times d}$ is illustrated in Eq. 3 below. LL, LN, and SA represent linear layer, layer normalization and self attention, respectively. $\oplus$ is the concatenation operator.

$$u^{sa} = SA(LL(LN(u^e \oplus g^{int\_e}; \theta^{LN}); \theta^{LL}; \theta^{SA}) \qquad \text{Eq. 3}$$

The model parameters for LL, LN and SA are, respectively, $\theta^{LL}$, $\theta^{LN}$ and $\theta^{SA}$.

The self attention SA is as shown in Eq. 4.

$$SA(x; \theta^{SA}) = \text{softmax}\left(\frac{Q_x K_x^T}{\sqrt{d_x}}\right) V_x \qquad \text{Eq. 4}$$

Query, key and value ($Q_x$, $K_x$, $V_x$) are calculated from input x using three different linear projections, respectively, $LL_q(x)$, $LL_k(x)$ and $LL_v(x)$. $d_x$ is the dimension of the input x and also of $K_x$.

Next, the original embedding tensor is added and a layer normalization is performed before proceeding to the auxiliary network 3-10. See Eq. 5.

$$\widehat{u^e} = LN(u^e + u^{sa}; \theta) \qquad \text{Eq. 5}$$

To obtain the slot type weights, the slot type attention module 3-3 projects the input utterance into various representations, one for each slot type of the number of slot types. Slot type attention module 3-3 thus explains the slots at a fine level of granularity. The weights are computed over the entire input for each token and also per slot type. Multiple attentions are computed, one for each slot type. Thus, embodiments obtain slot type specific attention weights per token with respect to the entire input utterance.

Training is important to obtain meaningful weights. Training proceeds as follows. Embodiments project the input utterance into n (number of slot types for the entire problem definition) different embedding vectors. Embodiments use these n projections to predict each of the slot type binary outputs. While training, embodiments train each binary classifier to predict this binary decision and because of this explicit auxiliary network training, embodiments are able to learn the slot type specific attention weights as embodiments constrain and relate the overall network with direct linking of n times self attentions with n binary classifiers. That is, the n binary classifiers predict each token whether it belongs to a token type or not. The binary classifiers are not able to identify entity spans as in the final slot classifier and they only predict whether each token belongs to a slot type or not. This output is a soft value between 0 and 1.

The process of obtaining training data for the auxiliary network is as follows.

Step 1 of obtaining training data: For slot types except O, put a digit "1" to slot tokens (B- and I-prefixed labels belonging in each slot type) and put a digit "0" otherwise.

Step 2 of obtaining training data: For O slot type, all non-slot tokens are marked as digit "1" and the rest are marked as digit "0."

slot type. See the example of Table 1, which indicates the original ground truth in BIO (sequence labeling) format.

Further with respect to training, binary input vectors (such as the example of Table 1) are used to train each of the binary classifiers (see item 3-4 in FIG. 3) where each binary classifier is responsible for only one slot type. Each binary classifier outputs logits where for each token, a numeric value between 0 and 1. Embodiments do not use the truth prediction of these classifiers by classifying into 0 or 1 using a threshold but use the exact logit values to feed into the final slot classifier as newly generated features which improve the performance of slot classifier 3-6. That is, the logits provide additional features and insights for the final slot classification by slot classifier 3-6.

As mentioned above, without proper supervision (training), these weights of the auxiliary network 3-10 would not be meaningful. Embodiments provide binary classifiers to ensure the weights are meaningful. The multiple projections are made to correspond respectively to the multiple classifiers. There is one classifier for each slot type. The self attention defined in Eq. 5 is applied $|T^{label}|$ number of times ($|T^{label}|$=n, number of slot types for this problem), one for each slot type by projecting different query, key and value ($Q_{label\_i}$, $K_{label\_i}$, $V_{label\_i}$ tensors (which are $\in R^{l \times d_h}$) from $\widehat{u^e}$, each using three different linear projections. Self attended output is given in Eq. 6a and weights are given in Eq. 6b.

$$h_{type\_i} = \text{softmax}\left(\frac{Q_{type\_i} K_{type\_i}^T}{\sqrt{d_h}}\right) V_{type\_i} \qquad \text{Eq. 6a}$$

$$\alpha_{type\_i} = \text{softmax}\left(\frac{Q_{type\_i} K_{type\_i}^T}{\sqrt{d_h}}\right) \qquad \text{Eq. 6b}$$

As mentioned above, slot type projections require additional optimization objectives so that the self attention weights are meaningful and not random noise. Embodiments train each slot type projection to predict binary output that states whether an input token in the utterance is true (1) or false (0) for that slot type. This data takes the role of ground truth for the training of the auxiliary network that computes slot type specific attentions. This training data is automatically generated from sequence labeling BIO ground truth as shown in the example in Table 1. Binary format for a slot type except for O is generated by assigning digit "1" to slot tokens (non-O positions) and assigning digit "0" otherwise. For O, all non-slot tokens are marked as digit "1" and the rest as digit "0."

TABLE 1

| | | Utterance | | | | | | | | |
|---|---|---|---|---|---|---|---|---|---|---|
| | Sequence Labelling | Find O | A O | Flight O | From O | Los B-Origin | Angeles I-Origin | To O | New B-destination | York I-destination |
| Binary format | Origin | 0 | 0 | 0 | 0 | 1 | 1 | 0 | 0 | 0 |
| | Destination | 0 | 0 | 0 | 0 | 0 | 0 | 0 | 1 | 1 |
| | Time | 0 | 0 | 0 | 0 | 0 | 0 | 0 | 0 | 0 |
| | O | 1 | 1 | 1 | 1 | 0 | 0 | 1 | 0 | 0 |

To train the n binary classifiers, embodiments create training data as shown in the example of Table 1 and using the steps given above. In general, for each utterance, embodiments create n different training examples, one per With the additional optimization objectives for each slot type, self attention weights can be used to visualize attention points of the input for each token with respect to each slot type as explanations. This is because: (i) per slot type, the embedding for the token being classified is computed attending to all the input tokens including itself, (ii) the same token embedding is used for the particular slot type classification (controlled supervision), and (iii) type classification output logits are fed to the final slot classification as additional features (explicit connection to final classification). Embodiments provide binary classification output logits enabling the model to learn general patterns/features specific to each slot type that also boost model performance. Binary classification for $i^{th}$ slot type type_$i \in T^{label}$ is performed as follows.

Embodiments initialize a set of weight tensors $W^H$ and bias $b^H$ wherein there are $|T^{label}|$ Of these.

An output feature vector is then given as in Eq. 7.

$$g^{slot\_type}_{type\_i} = h_{type\_i} W^H_{type\_i} + b^H_{type\_i} \qquad \text{Eq. 7}$$

Where the dimension of the LHS of Eq. 7 is 1×1, and the dimension of the respective three variables on the RHS of Eq. 7 from left to right is 1×$d_h$, $d_h$×1 and b is a scalar.

The cross entropy loss for optimization is computed as shown in Eq. 8.

$$L^{type} = -\left(\frac{1}{N}\right)\left(\sum_{j=1}^{N} Y^t_j \log(p_j) + (1 - Y_j)\log(1 - p_j)\right) \qquad \text{Eq. 8}$$

Where $Y^t_j$ is the is the one-hot encoded ground truth vector with element values 0, except a single 1, $p_j$ is the softmax probability, and N is the total number of data points. Embodiments measure the binary cross entropy loss collectively for all the slot-type classifiers. If there are $\eta$ data points originally in the dataset, then $N = \eta * |T^{label}|$. For a set S, $|S|$ indicates the number of elements in the set S.

Auxiliary network 3-10 performs obtaining a vector of slot type weights for visualization. The obtaining the vector of slot type weights is performed by the auxiliary network 3-10 based on the vector of token embeddings and based on the estimated intent.

Feature fusing module 3-5 performs a feature fusion based on the vector of slot type weights and based on the vector of token embeddings to obtain a vector of fused features.

Slot classifier 3-6 performs obtaining, based on the vector of fused features and using a slot classifier, a vector of classified slots corresponding to the utterance.

Visualization module 3-7 performs visualizing the vector of slot type weights in a two column format, wherein the two column format comprises a first column and a second column. Examples of the two-column format are given in FIGS. 2A and 2B. The slot type attention weights are provided by Eq. 6b. Slot explanation visualization is performed using the slot type weights from Eq. 6b. This provides the ability to visualize attention distribution on the utterance for a token for a particular slot type. See FIGS. 2A, 2B and 2C.

Slot type logits obtained as explained above are AI features provided by embodiments, these AI features improve the accuracy of the slot classifier 3-6. The slot type logits are slot type specific and capture fine grained slot patterns. For quantitative examples of improvements compared to other language modelers for benchmark data sets, see Table 1 of U.S. Provisional Application No. 63/307,592 filed Feb. 7, 2022 to which benefit or priority is claimed, all of which application has been incorporated by reference above.

As mentioned above, embodiments combine slot specific features with original utterance embeddings. Each binary classifier outputs l length vectors where l is the original utterance length. That is, each binary classifier outputs logits values, one real number per utterance token. Embodiments first combine the all binary classifier outputs (there are n binary classifiers) by concatenating them at the token level providing an l×n matrix, $g^{slot\_type\_c}$. This is projected into $g^p$ having the same dimension as input utterance through a linear layer.

Then two projections from $g^p$ are computed using two different linear layers. These two projections act as Key and Value vectors for the self attention (cross attention because Query comes from different source than Key and Value) performed with the original utterance embedding vector Query. The Query vector is computed from the original utterance embedding vector by applying a linear projection. Then, the cross attention mechanism is applied using the Query projected from the input utterance and Key and Value results projected from the slot type features. This cross attention mechanism is extracting features $u^{cross}$ from the input utterance influenced by the slot type features computed using slot type attention modeling. Cross attention is performed using self attention but query and key are projected from two different sources.

Specifically, embodiments concatenate all the slot type logits per each input utterance token and then apply cross attention on it by having query $Q_{u^e}$ projected from $u^e$ and key $k_{g^p}$ and value $V_{g^p}$ projected from the concatenated and projected slot type logits $g^p$. See the right hand portion of FIG. 4B, "cross attention."

Thus, embodiments perform feature fusion by computing a cross-attention vector based on the vector of slot type weights and based on the vector of token embeddings. The feature fusion includes forming an intermediate vector as a sum of the cross-attention vector and the vector of token embeddings. Also, the feature fusion includes forming the vector of fused features based on a applying the intermediate vector to a linear layer and normalizing an output of the linear layer.

The logits concatenation is performed at the token level where all the slot type logits for a token are concatenated to produce the tensor $g^{slot\_type\_c}$ which is $\in R^{l \times |T^{label}|}$. Then the concatenated logits tensor is projected to get $g^p$ which has dimension 1×d. Cross attention is then applied between utterance $u^e$ and $g^p$ to get slot type aware utterance representation $u^{cross}$ which has dimension 1×d.

Query, key and value tensor projections (dimension 1×d) are computed as follows. The layer parameters for the three different projection layers are $\theta^1$, $\theta^2$, and $\theta^3$.

$$Q_{u^e=LL(u^e;\theta^1)}, K_{g^p=LL(g^p;\theta^2)}, V_{g^p=LL(g^p;\theta^3)}.$$

$$u^{cross} = \text{softmax}\left(\frac{Q_u e K^T_g p}{\sqrt{d}}\right) V_g p \qquad \text{Eq. 9}$$

Cross attention between the utterance embeddings and slot type logits highlights slot type specific features from the utterance embeddings. This is added to the utterance as follows to provide the slot classifier input $u^{slot}$, which has dimension 1×d. "drop(•)" indicates application of dropout. Dropout is applied, to generalize and reduce over fitting, for the embedding vector passed from the feature fusion module 3-5. Embodiments apply the single layer classifier that outputs slot logits $g^{slot}$. Argmax is applied on top of these logits to determine the correct slot predictions from the candidate slots where maximum value index from argmax is the predicted slot label. $S^{label}$ is the BIO slot label set.

$$u^{slot}=drop(LL(LN(u^e+u^{cross};\theta^{sLN});\theta^{sLL})) \qquad \text{Eq. 10}$$

Finally, the slot logits tensor $g^{slot}$ which is of dimension $1\times|S^{label}|$, is computed as shown in Eq. 11 ($W^{slot}$ has dimension $d\times|S^{label}|$).

$$g^{slot}=u^{slot}W^{slot}+b^{slot} \qquad \text{Eq. 11}$$

The slot loss $L^{slot}$ is computed using the cross entropy loss as shown in Eq. 12.

$$L^{slot} = -\sum_x{}^{|S^{label}|} Y_x \log(p_x) \qquad \text{Eq. 12}$$

The various parameters $\theta$ of the three networks indicated by the intent classifier 3-2, the auxiliary network 3-10 and the slot classifier 3-6 are trained using an overall loss defined in Eq. 13, in which hyperparameters representing loss weights are indicted by $\alpha$, $\beta$, $\gamma$.

$$L=\alpha L^{intent}+\beta L^{type}+\gamma L^{slot} \qquad \text{Eq. 13}$$

Figure 4A:
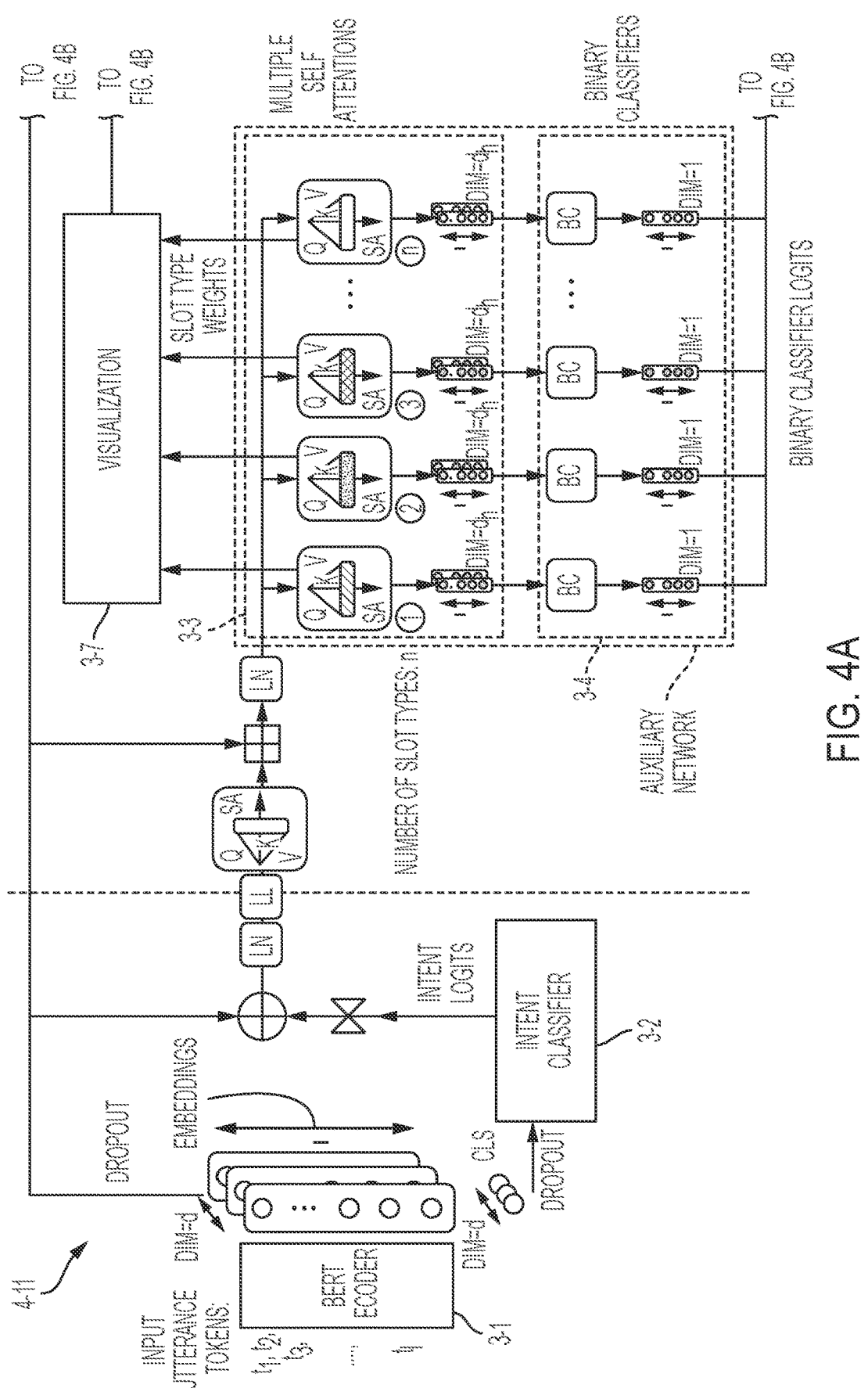
FIG. 4A and FIG. 4B illustrate a first detailed block diagram showing both functional blocks and data structures, according to some embodiments.
Figure 4B:
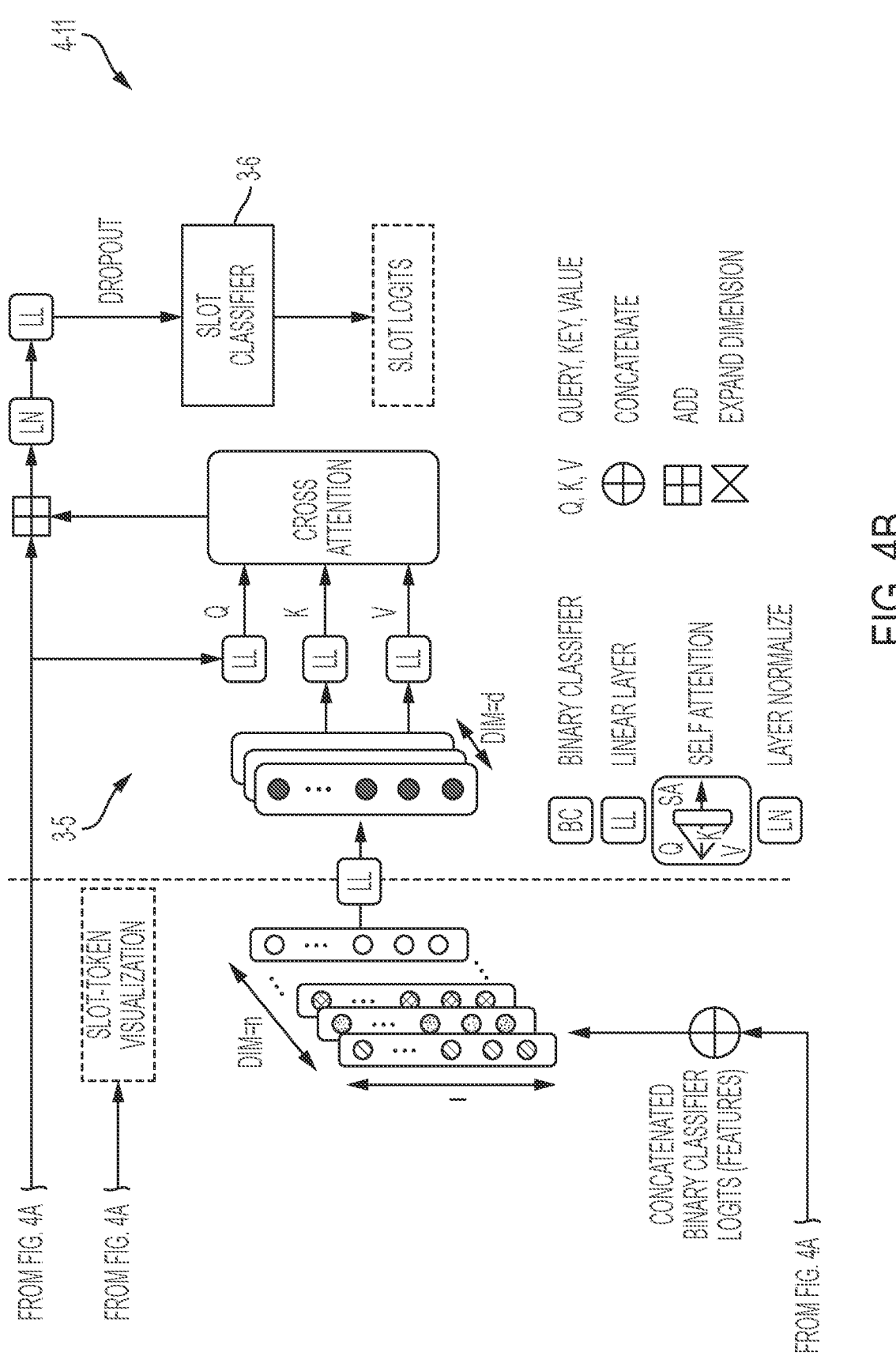

FIG. 4A and FIG. 4B illustrate further details of portions of FIG. 3. Item numbers such as 3-1, 3-2, etc., from FIG. 3 are also included in FIG. 4A and FIG. 4B.

In FIG. 4A, language encoder 3-1 is a BERT encoder. An example of a basic BERT encoder has 12 layers (transformer blocks), 12 attention heads, 110 million parameters, and an output dimension size of 768.

As shown in FIG. 4A and FIG. 4B, the input utterance is the set of tokens $t_1, t_2, \ldots t_l$. 1 (lower case el) is the number of tokens. The encoder, for each token, produces d features. An example value of d is 768.

The BERT encoder outputs the token embeddings. The intent classifier 3-2 operates on the token embeddings to produce the intent logits.

As shown in FIG. 4A and FIG. 4B and mentioned above regarding FIG. 3, the auxiliary network 3-10 includes the slot type attention module 3-3 and the slot type classifier 3-4. Internally, the slot type attention module 3-3 performs the attention computation including Q, K and V for each of n slot types. The projection embedding size is referred to as $d_h$. For each slot type, the result is a data structure of dimension $1\times d_h$. The resulting slot type weights are passed to the visualization module 3-7.

The slot type classifier 3-4 outputs vectors of dimension $1\times 1$ composed of binary classifier logits. A binary classifier logit is a likelihood indication of whether a given token should be associated with that slot type.

To provide an input to feature fusing module 3-5, the binary classifier logits are concatenated and the resulting data structure has dimension $1\times n$. This data structure, in the feature fusing module 3-5 passes through a linear layer ("LL") to obtain a data structure of dimension $1\times d$. This data structure is processed by respective linear layers to obtain K and V values. Q values are obtained by applying a linear layer to the token embeddings. Cross attention is the applied to the Q, K and V values and the result is added to the token embeddings. The result of the sum is applied to a layer normalization ("LN") and a linear layer, and the output is input to slot classifier 3-6, which provides the slot logits.

Figure 5A:
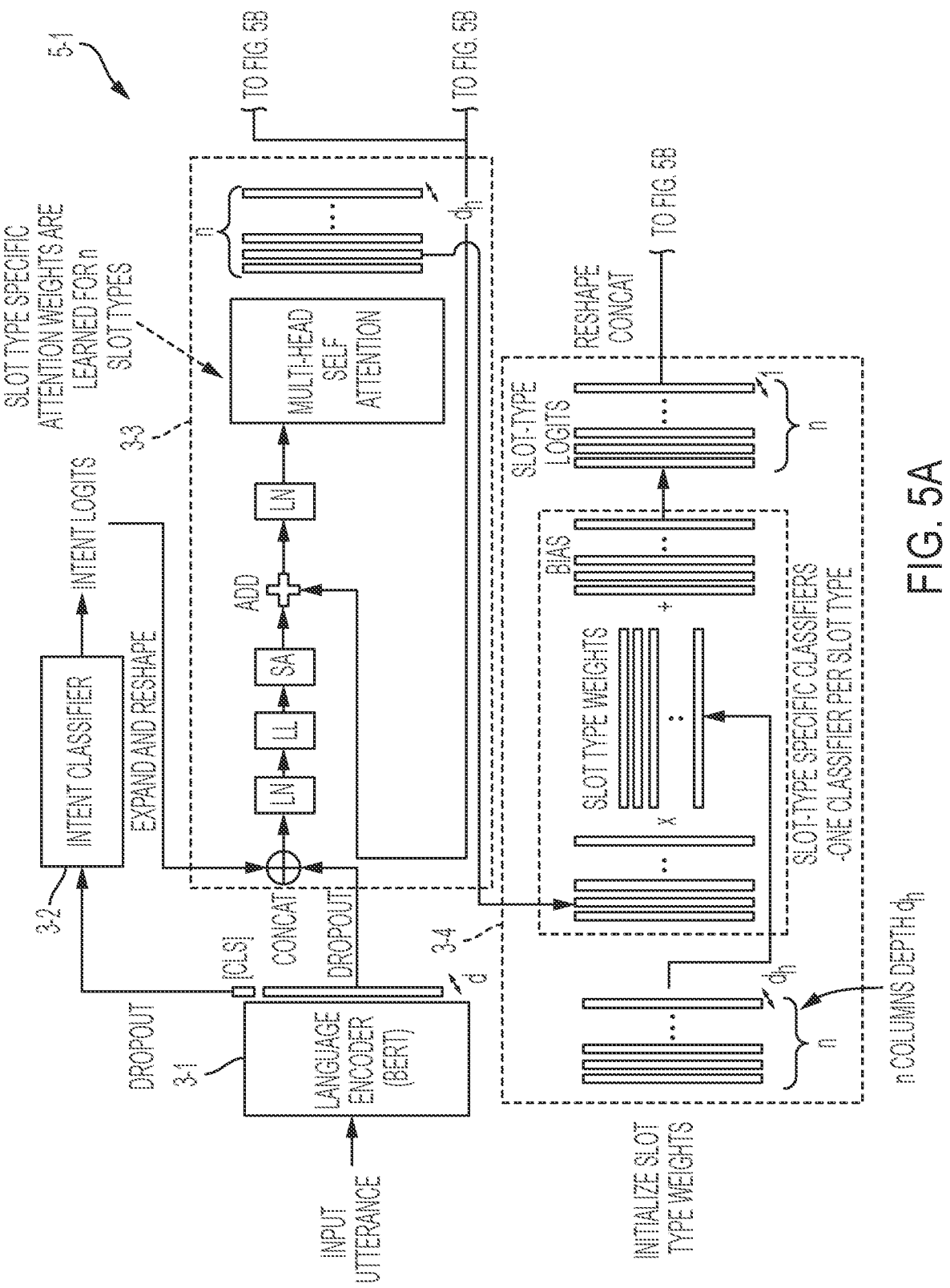
FIGS. 5A and 5B illustrate a second detailed block diagram showing both functional blocks and data structures, according to some embodiments.
Figure 5B:
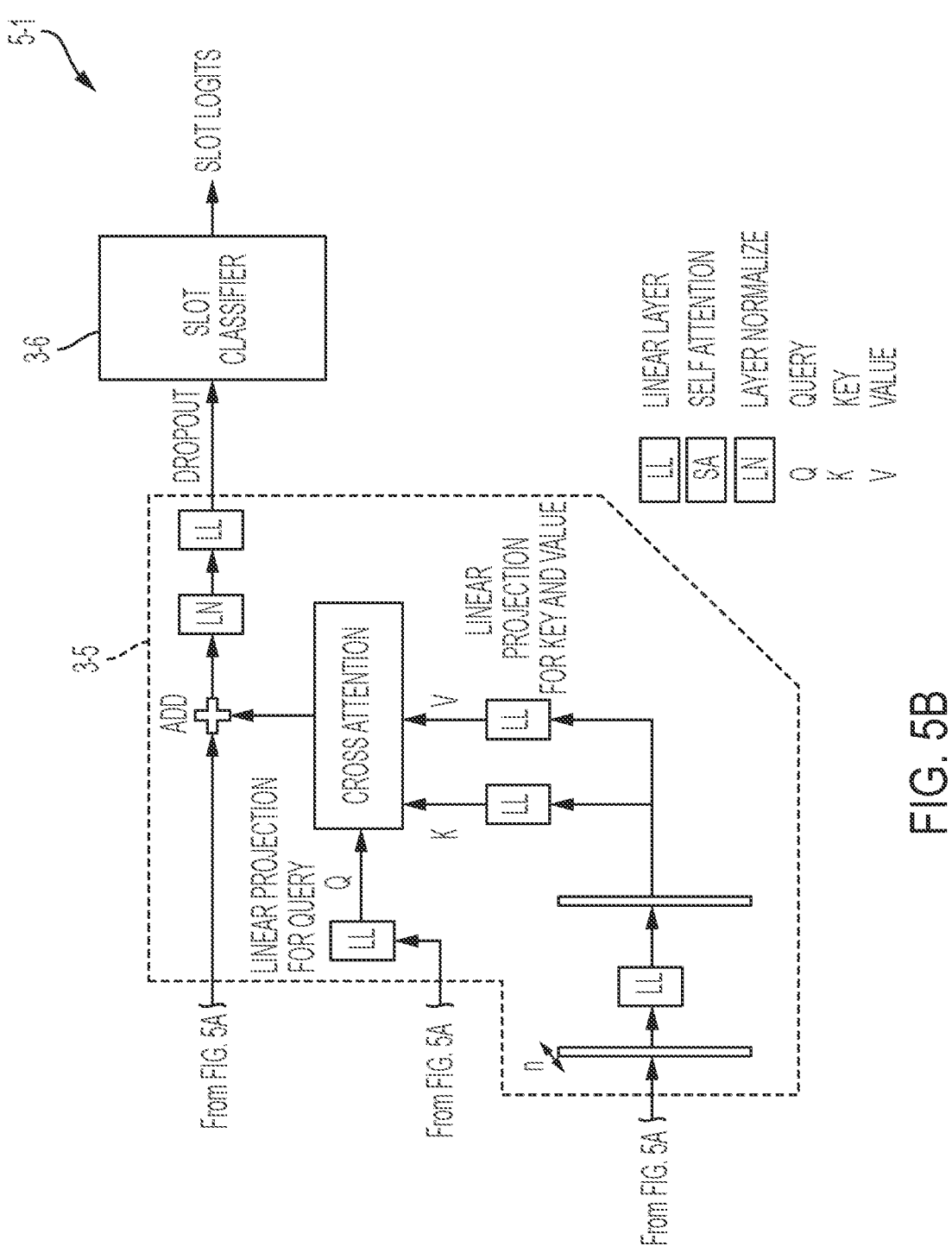

FIG. 5A and FIG. 5B provide an illustration of some of the data structures flowing through FIG. 4A and FIG. 4B.

Considering FIG. 5A and FIG. 5B, the slot type attention module 3-3 receives two inputs: intent logits from intent classifier 3-2 and token embeddings from language encoder 3-1. These are concatenated and then pass through a layer normalization (LN), a linear layer (LL), a self attention computation (SA, obtaining Q, K and V values) and the result is added to the token embeddings. The result of the addition is then normalized (LN) input to a multi-head self attention computation to obtain a result of dimension $1\times n\times d_h$.

FIG. 5A and FIG. 5B illustrate that slot type weights are initialized with a data structure having dimension $1\times n\times d_h$. The slot type weights computation is trained. During inference phase, the output of the multi-head self attention is applied to the slot type weights and a bias added. The result is the slot type logits which are of dimension $1\times n\times 1$. These are reshaped and concatenated to provide an input for K and V computation in the feature fusing module 3-5 as explained with respect to FIG. 4A and FIG. 4B.

Figure 6:
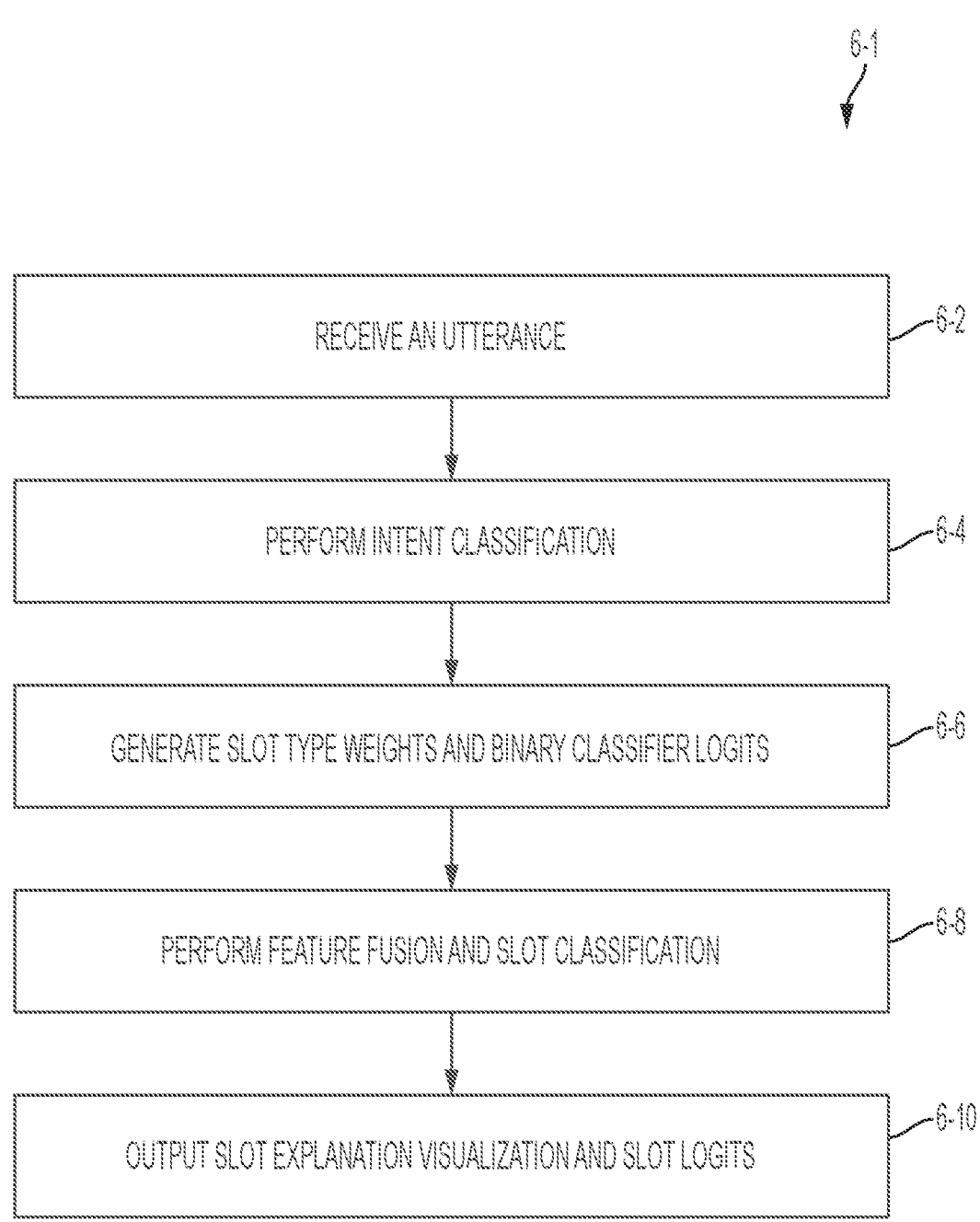
FIG. 6 illustrates a high-level logic flow for utterance recognition and model visualization, according to some embodiments.

FIG. 6 illustrates a logic flow 6-1 for performing utterance recognition and slot visualization of system 1-11. At operation 6-2, an utterance is received. At operation 6-4, intent classification is performed on the utterance.

At operation 6-6, slot type weights and binary classifier logits are obtained based on the utterance.

At operation 6-8, feature fusion is performed based on utterance and the binary classifier logits.

At operation 6-10, visualization is provided based on the slot type weights and utterance recognition is provided in terms of slot logits.

Logic 7-1 of FIG. 7 illustrates an embodiment of system 1-11. Logic 7-1 receives a user input utterance and performs parsing the utterance into a vector of tokens, see operation 7-2.

Logic 7-1, at operation 7-4, performs encoding the utterance with an encoder to obtain a vector of token embeddings.

Logic 7-1, at operation 7-6, performs applying an intent classifier, based on the vector of token embeddings, to obtain an estimated intent. Intent classifier 3-2 also provides intent logits.

Logic 7-1, at operation 7-8, performs obtaining a vector of slot type weights for visualization.

Logic 7-1, at operation 7-10 performs obtaining a vector of multiple self-attentions based on the vector of token embeddings and based on the estimated intent.

Logic 7-1, at operation 7-12 provides a visualization of the slot type weights in a two column format.

Logic 7-1, at operation 7-14, performs a feature fusion based on the vector of slot type weights and based on the vector of token embeddings to obtain a vector of fused features.

Logic 7-1, at operation 7-16 performs obtaining, based on the vector of fused features and using a slot classifier, a vector of classified slots corresponding to the utterance.

Figures 8A, 8B:
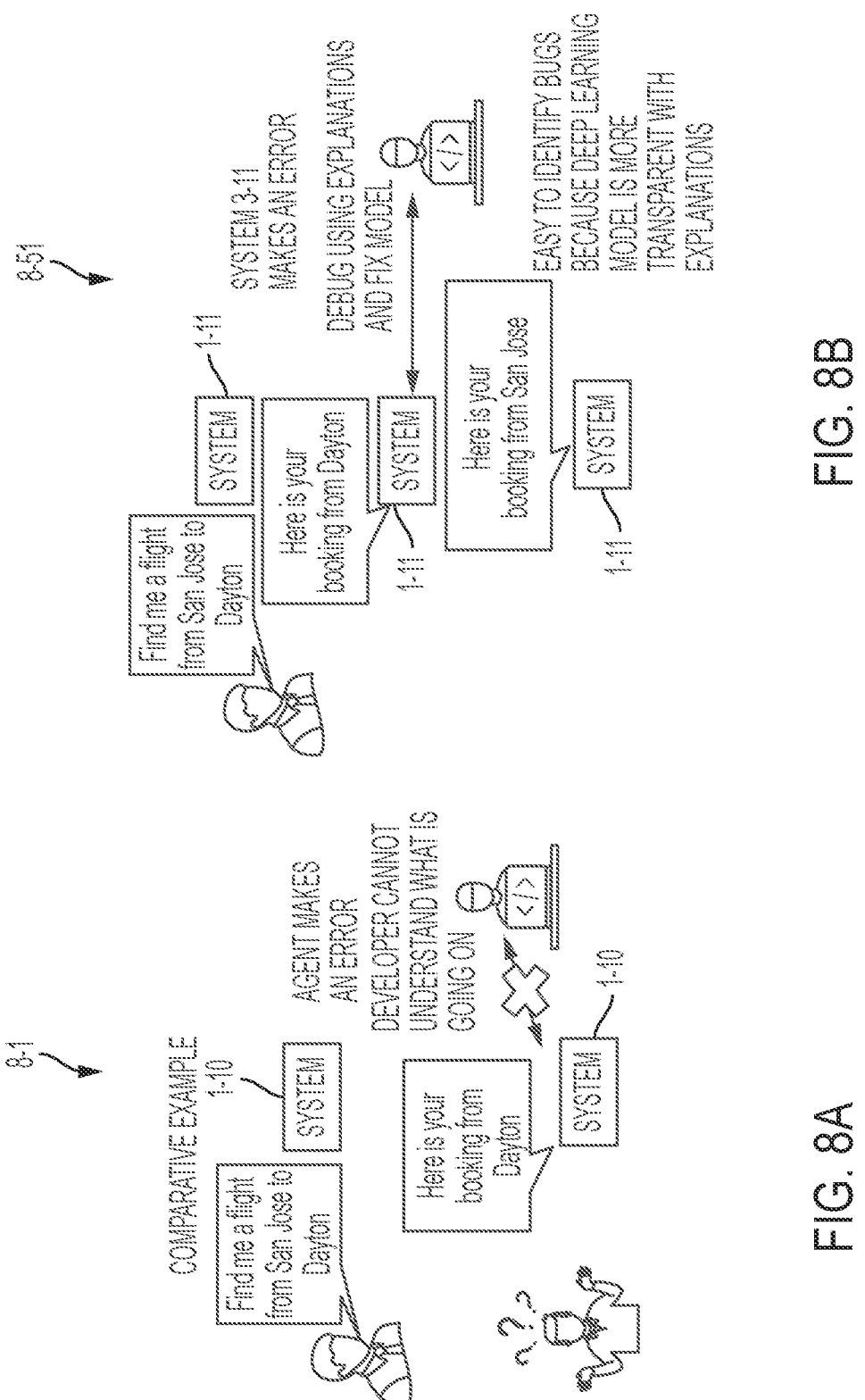
FIG. 8A illustrates a comparative example of a developer not being able identify a cause of an error.
FIG. 8B illustrates an example of a developer being able to inspect attention values per slot type and thus identify a cause of an error, according to some embodiments.

FIG. 8A illustrates a comparative example dialog 8-1 of a system 1-10 (not an embodiment) responding to an utterance "find me a flight from San Jose to Dayton." The agent responds with the AI assistant output "Here is your booking from Dayton," which is an error. The agent has not properly classified the slot for the destination city. A developer seeking to improve the system 1-10 does not have information on the attention provided by system 1-10 for each slot type.

FIG. 8B provides an exemplary dialog 8-51 according to some embodiments (see, for example, FIG. 3). The utterance is the same as in FIG. 8A. The error (system 1-11 is being tested or trained, and errors may occur during this process) is the same as in FIG. 8A. However, a developer is able to debug the system 1-11 because slot type attention is provided specifically for each of the origin city and the destination city. As examples of slot type attentions visualized, see FIGS. 2A, 2B, and 2C. The developer (also referred to as "debugging engineer") then reconfigures and retrains the AI model of the system 1-11 and the system 1-11 then provides a correct response ("Here is your booking from San Jose."). Thus, embodiments include altering, by a debugging engineer, the intent classifier 3-2 and/or the slot classifier 3-6 and/or the auxiliary network 3-10 based on the vector of slot type weights visualized in the two column format (FIGS. 2A, 2B, 2C).

Figures 9A, 9B:
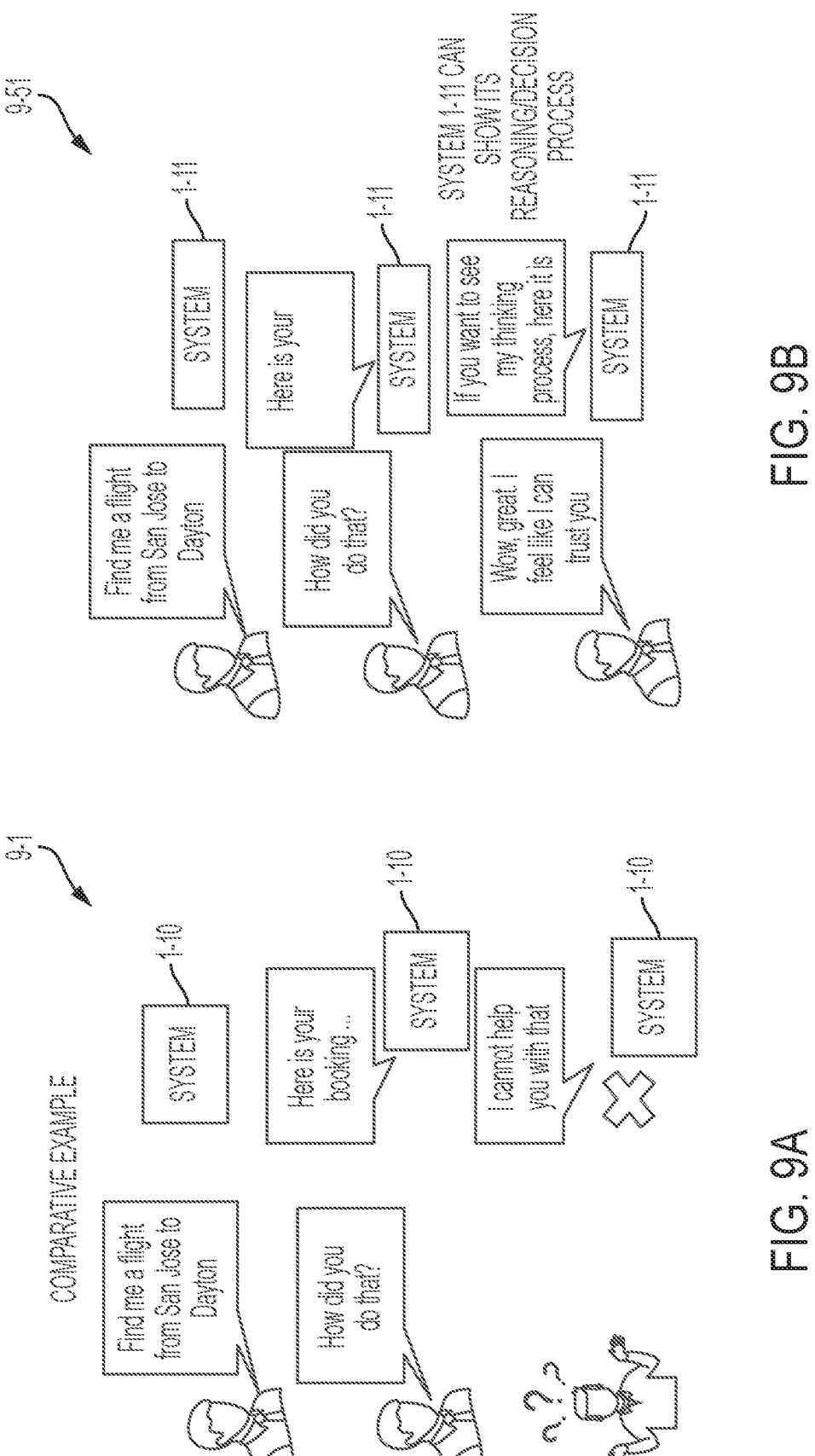
FIG. 9A illustrates a comparative example of a user attempting to inspect an artificial intelligence personal assistant and being unable to learn.
FIG. 9B illustrates an example of a user being able to inspect attention values per slot type and thus understand how an AI personal assistant is working, according to some embodiments.

FIG. 9A illustrates a comparative dialog 9-1 in which a user asks for a flight from San Jose to Dayton. System 1-10 (not an embodiment) then provides a booking suggestion. The user asks the system 1-10 how the utterance was understood ("how did you do that?"). The system 1-10 is not able to explain its thought process ("I cannot help you with that"). The user then is might not be confident that the system 1-10 can be trusted.

FIG. 9B illustrates a dialog 9-51 with system 1-11 (see, for example, FIG. 3). When the user asks "how did you do that?" the system is able respond with per slot attention values in the two column format such as in FIGS. 2A, 2B, and 2C. Thus, embodiments include outputting a vector of classified slots for fulfillment by a voice-activated artificial intelligence-based personal assistant (system 1-11).

In some embodiments, intent explainability is provided along with the classifier.

Figure 11:
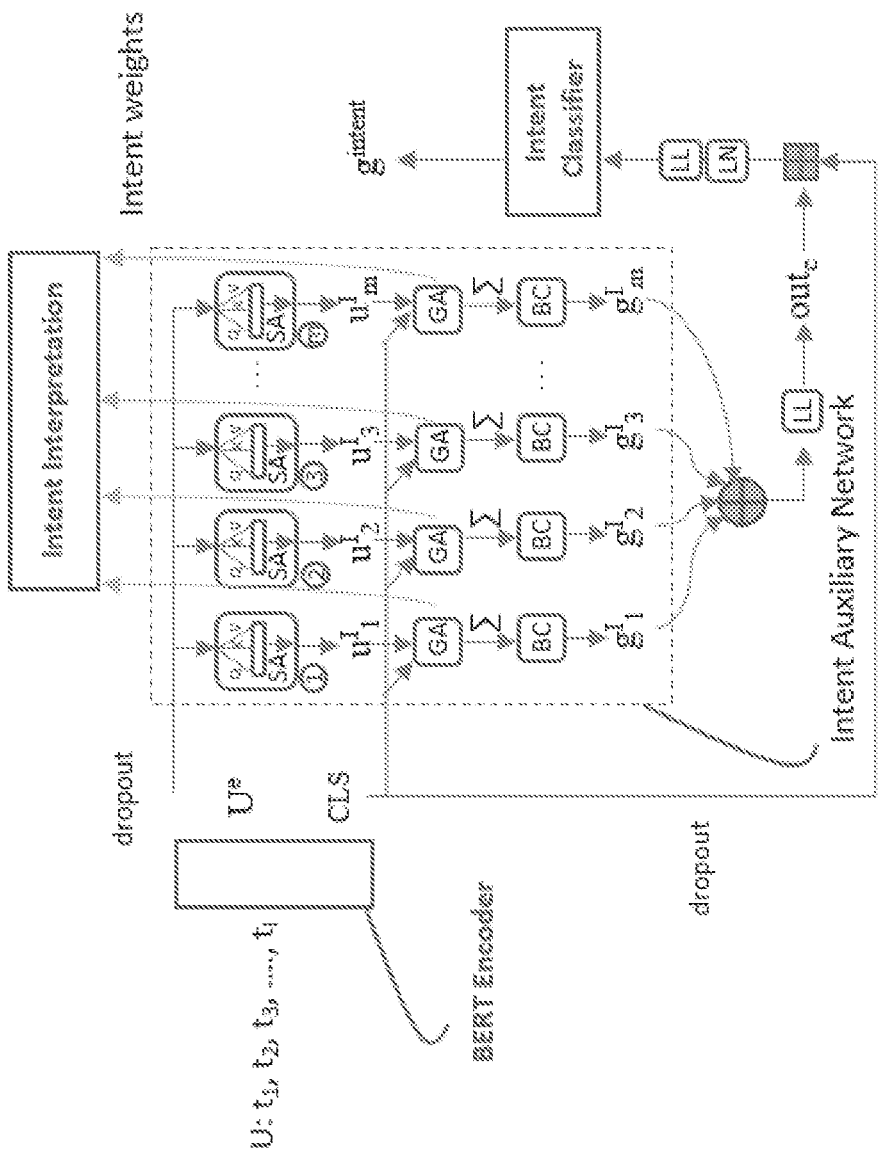
FIG. 11 illustrates a detailed block diagram for visualizing intent, according to some embodiments.

FIG. 11 illustrates visualization of intent. FIG. 11 includes an intent auxiliary network, which is similar to the slot type auxiliary network of FIGS. 4A, 4B, 5A and 5B.

In FIG. 11, outputs of binary classifiers contribute to the input to the intent classifier. The intent classifier produces an estimate $g^{intent}$ Turning to FIG. 4A, the $g^{intent}$ of FIG. 11 then replaces the intent logits of FIG. 4A.

Intent weights are developed in FIG. 11, and then these are used for intent interpretation of intent visualization.

Details of obtaining the intent weights and $g^{intent}$ are provided in the description below, including Equations 14-20.

The following description relates to a general classification task. A specific example is intent classification and explainability for NLU. Intent classification and explainability is analogous to sentence classification and many other similar classification applications. Some embodiments use a two step transformation as shown in FIGS. 4A, 4B, 5A, and 5B for intent classification and explainability. The two step transformation is also applicable to many other similar such classifications.

In the two step transformation, embodiments first use multiple self attentions to transform input into m (number of intent classes in the NLU case) transformations and then use general query-based attention to learn and compute explainable attention weights.

In a first step, the input words of the input utterance are visualized with respect to their importance to the intent classification task. Fine grained explainability is provided by embodiments, that is to be able to explain through visualization of attention weights per intent class. The input utterance is projected into the number of intent class labels (m) using m times separate self attentions. The original utterance is projected into every intent class representation. The $i^{th}$ intent class projection of input utterance $u^e$ is as follows.

$$u_i^I = SA(u^e; \theta^{I_i})$$

<div align="right">Eq. 14</div>

In a second step, a general attention mechanism is applied on those projections so that attention weights on the input utterance tokens are obtained with respect to each intent class. The CLS embedding from the BERT encoding of utterance u is the query for the general attention. Score vector $score_i$ for the $i^{th}$ intent class and the corresponding attention weights $\alpha_i$ are computed as follows.

$$score_i = CLS \times u_i^I$$

<div align="right">Eq. 15</div>

$$\alpha_i = softmax(score_i)$$

<div align="right">Eq. 16</div>

As a third step, attention weights $\alpha$ computed using general attention are used to visualize intent detection task. Embodiments supervise this attention weights computation specifically and hence embodiments use a set of binary classifiers, one for each intent class. Each binary classifier predicts whether the its corresponding intent class (designated for the binary classifier) as true or false. For each binary classifier, embodiments take the average token embeddings as the input as follows. The $i^{th}$ intent class representation $c_i$ of the input utterance u is computed as follows using the $i^{th}$ intent class attention weights $$\alpha_i . t_{i,x} \in u_i^I,$$

the $x^{th}$ token embedding in the intent class representation of input utterance u.

$$c_i = \left(\frac{1}{l}\right) \sum tanh(\alpha_{i,x} t_{i,x})$$

<div align="right">Eq. 17</div> where the summation is from x=1 to l.

FIG. 12 illustrates the values of $c_i$ as shading behind the words for positive intent and negative intent examples.

In a fourth step, embodiments initialize a set of weight tensors $W^I$ and bias $b^I$ where the set sizes of weight tensors $W^I$ and bias $b^I$ and I are the same and compute a binary classifier $$g_i^I \in R^1$$

as follows.

$$g_i^I = c_i W_i^I + b_i^I$$

<div align="right">Eq. 18</div>

The network is optimized using cross entropy loss $L^I$.

As a fifth step, embodiments, concatenate intent class specific binary classifier logits and apply a linear layer to get $out_c = Linear(concat(g^I))$ where $out_c \in R^d$. Embodiments then add the original context CLS with the concatenated intent-specific logits to get $CLS^c=LL(LN(CLS+out^c; \theta^{nc}); \theta^{lc})$.)
Then the intent classification is performed as follows.

$$g^{intent}=CLS^c W^{intent}+b^{intent} \qquad \text{Eq. 19}$$

Full network optimization with slot classifier and slot type classifier are performed as follows with the aggregated loss, where weights to be adjusted for performing the optimization are given as $\alpha$, $\eta$, $\beta$, and $\gamma$.

$$L=\alpha L^{intent}+\eta L^I+\beta L^{type}+\gamma L^{slot} \qquad \text{Eq. 20}$$

Figure 10:
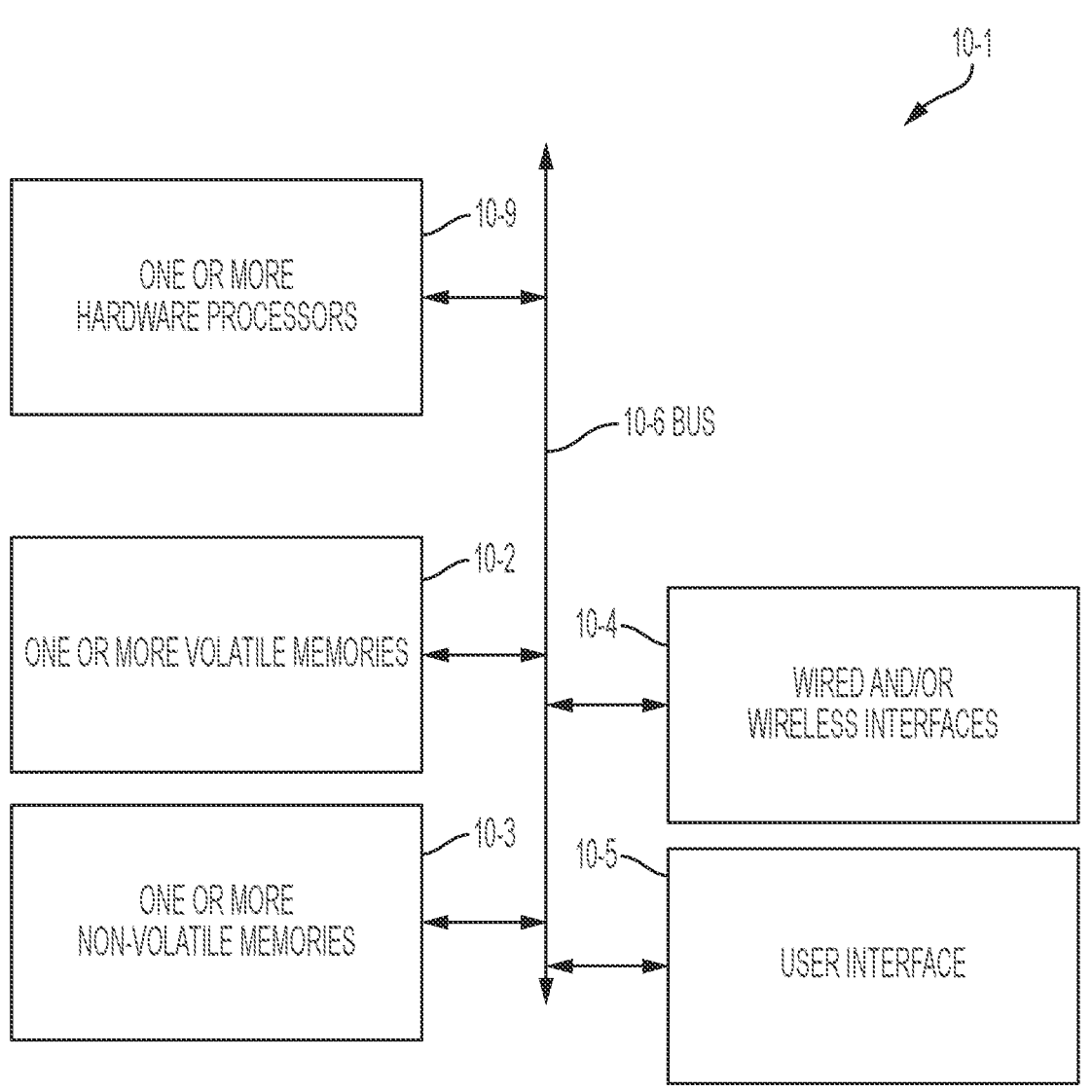
FIG. 10 illustrates exemplary hardware for implementation of a computing device corresponding to embodiments.

Hardware for performing embodiments provided herein is now described with respect to FIG. 10.

FIG. 10 illustrates an exemplary apparatus 10-1 for implementation of the embodiments disclosed herein, for example system 1-11 shown in FIG. 3. The apparatus 10-1 may be a server, a computer, a laptop computer, a handheld device, or a tablet computer device, for example. Apparatus 10-1 may include one or more hardware processors 10-9. The one or more hardware processors 10-9 may include an ASIC (application specific integrated circuit), CPU (for example CISC or RISC device), and/or custom hardware. Apparatus 10-1 also may include a user interface 10-5 (for example a display screen and/or keyboard and/or pointing device such as a mouse). Apparatus 10-1 may include one or more volatile memories 10-2 and one or more non-volatile memories 10-3. The one or more non-volatile memories 10-3 may include a non-transitory computer readable medium storing instructions for execution by the one or more hardware processors 10-9 to cause apparatus 10-1 to perform any of the methods of embodiments disclosed herein.

An example is provided above of joint intent detection and slot filling task.

Some examples also include adding an explainable component to the slot filling task. As shown, embodiments improve joint model accuracy in addition to providing explanations for the slot filling task.

Application of the explainable component of embodiments can be applied to any classification task to provide inherent explainability (no need of post-hoc techniques) to an existing classification method.

As an example provided above, a joint NLU model can include explainability in intent detection. See FIG. 1A, FIG. 4A, FIG. 4B and FIG. 6. Intent detection can be considered similar to document classification, paragraph/sentence classification where model classifies the entire input into one of candidate class labels.

On the other hand, slot filling is similar to other applications such as named entity recognition (NER), part-of-speech (POS) tagging, and information extraction (IE).

Therefore, embodiments provided herein are applicable to applications similar to slot filling where each word/token in an input has to be classified into one of the candidate class labels.

As explained above, the inherently explainable component of embodiments may include: (i) transforming the input into exact number of final classifier classes also incorporating a suitable attention mechanism, (ii) constraining the attention weight learning through an auxiliary network of classifiers with an additional task, and (iii) combining the output of the auxiliary network with the main network classifier so that with the new features, the main network classifier performance can also be improved.

What is claimed is:

1. A method of visualizing a natural language understanding model, the method comprising:

parsing an utterance into a vector of tokens;

encoding the utterance with an encoder to obtain a vector of token embeddings;

applying an intent classifier, based on the vector of token embeddings, to obtain an estimated intent;

obtaining a vector of slot type weights for visualization, wherein the obtaining the vector of slot type weights uses an auxiliary network and is based on the vector of token embeddings and based on the intent logits, wherein obtaining the vector of slot type weights comprises, for each slot type, applying a binary classifier to the vector of multiple self-attentions to obtain the vector of slot type weights;

obtaining a vector of multiple self-attentions, wherein the obtaining the vector of multiple self-attentions uses the auxiliary network and is based on the vector of token embeddings and based on the intent logits, wherein the estimated intent includes a vector of intent logits, and wherein the obtaining the vector of multiple self-attentions comprises:

concatenating the vector of intent logits with the vector of token embeddings to obtain an expanded intent logits vector, and obtaining the vector of multiple self-attentions based on the expanded intent logits vector;

visualizing the vector of slot type weights in a two column format, wherein the two column format comprises a first column and a second column;

performing a feature fusion based on the vector of slot type weights and based on the vector of token embeddings to obtain a vector of fused features; and obtaining, based on the vector of fused features and using a slot classifier, a vector of classified slots corresponding to the utterance.

2. The method of claim 1, further comprising outputting the vector of classified slots for fulfillment by a voice-activated artificial intelligence-based personal assistant.

3. The method of claim 1, wherein the visualizing the vector of slot type weights comprises providing a visual presentation including the first column and the second column with bars connecting column entries from the first column to the second column, the first column and the second column both listing the vector of tokens, wherein a first bar corresponds to a correspondence between a first token in the first column with a second token in the second column.

4. The method of claim 1, wherein a training of the vector of slot type weights is based on an output of the binary classifier.

5. The method of claim 4, wherein the performing the feature fusion comprises:

computing a cross-attention vector based on the vector of slot type weights and based on the vector of token embeddings;

forming an intermediate vector as a sum of the cross-attention vector and the vector of token embeddings; and forming the vector of fused features based on applying the intermediate vector to a linear layer and normalizing an output of the linear layer.

6. The method of claim 1, further comprising:

determining a vector of slot type attentions;

wherein the applying the slot classifier comprises operating on the vector of slot type specific attentions;

wherein the performing the feature fusion is further based on the vector of slot type specific attentions; and wherein the method further comprises visualizing the vector of slot type specific attentions.

7. A server for utterance recognition and model visualization, the server comprising:

one or more processors; and one or more memories, the one or more memories storing a program, wherein execution of the program by the one or more processors is configured to cause the server to at least:

parse an utterance into a vector of tokens;

encode the utterance with an encoder to obtain a vector of token embeddings;

apply an intent classifier, based on the vector of token embeddings, to obtain an estimated intent;

obtain a vector of slot type weights for visualization, wherein the obtaining the vector of slot type weights uses an auxiliary network and is based on the vector of token embeddings and based on the intent logits, wherein execution of the program by the one or more processors is further configured to obtain the vector of slot type weights by, for each slot type, applying a binary classifier to the vector of multiple self-attentions to obtain the vector of slot type weights;

obtain a vector of multiple self-attentions, wherein the obtaining the vector of multiple self-attentions uses the auxiliary network and is based on the vector of token embeddings and based on the intent logits, wherein the estimated intent includes a vector of intent logits, and wherein execution of the program by the one or more processors is further configured to obtain the vector of multiple self-attentions by:

concatenating the vector of intent logits with the vector of token embeddings to obtain an expanded intent logits vector, and obtaining the vector of multiple self-attentions based on the expanded intent logits vector;

visualize the vector of slot type weights in a two column format, wherein the two column format comprises a first column and a second column;

perform a feature fusion based on the vector of slot type weights and based on the vector of token embeddings to obtain a vector of fused features; and obtain, based on the vector of fused features and using a slot classifier, a vector of classified slots corresponding to the utterance.

8. The server of claim 7, wherein execution of the program by the one or more processors is further configured to cause the server to output the vector of classified slots for fulfillment by a voice-activated artificial intelligence-based personal assistant.

9. The server of claim 7, wherein execution of the program by the one or more processors is further configured to provide information for a debugging engineer to alter the intent classifier and/or the slot classifier and/or model training data based on the vector of slot type weights visualized in the two column format.

10. The server of claim 7, wherein execution of the program by the one or more processors is further configured to visualize the vector of slot type weights by providing a visual presentation including the first column and the second column with bars connecting column entries from the first column to the second column, the first column and the second column both listing the vector of tokens, wherein a first bar corresponds to a correspondence between a first token in the first column with a second token in the second column, thereby permitting a person to recognize focus points on the utterance relevant to the classification by a natural language understanding model.

11. The server of claim 7, wherein a training of the vector of slot type weights is based on an output of the binary classifier.

12. The server of claim 11, wherein execution of the program by the one or more processors is further configured to perform the feature fusion by:

computing a cross-attention vector based on the vector of slot type weights and based on the vector of token embeddings;

forming an intermediate vector as a sum of the cross-attention vector and the vector of token embeddings; and forming the vector of fused features based on a applying the intermediate vector to a linear layer and normalizing an output of the linear layer.

13. The server of claim 7, wherein execution of the program by the one or more processors is further configured to:

determine a vector of special slot type specific attentions;

wherein execution of the program by the one or more processors is further configured to apply the slot classifier by operating on the vector of special slot type specific attentions;

wherein execution of the program by the one or more processors is further configured to perform the feature fusion based on the vector of special slot type specific attentions; and wherein execution of the program by the one or more processors is further configured to visualize the vector of special slot type specific attentions.

14. A non-transitory computer readable medium configured to store a program for utterance recognition and model visualization, wherein execution of the program by one or more processors of a server is configured to cause the server to at least:

parse an utterance into a vector of tokens;

encode the utterance with an encoder to obtain a vector of token embeddings;

apply an intent classifier, based on the vector of token embeddings, to obtain an estimated intent;

obtain a vector of slot type weights for visualization, wherein the obtaining the vector of slot type weights uses an auxiliary network and is based on the vector of token embeddings and based on the intent logits, wherein execution of the program by the one or more processors is further configured to obtain the vector of slot type weights by, for each slot type, applying a binary classifier to the vector of multiple self-attentions to obtain the vector of slot type weights;

obtain a vector of multiple self-attentions, wherein the obtaining the vector of multiple self-attentions uses the auxiliary network and is based on the vector of token embeddings and based on the intent logits, wherein the estimated intent includes a vector of intent logits, and wherein execution of the program by the one or more processors is further configured to obtain the vector of multiple self-attentions by:

concatenating the vector of intent logits with the vector of token embeddings to obtain an expanded intent logits vector, and obtaining the vector of multiple self-attentions based on the expanded intent logits vector;

visualize the vector of slot type weights in a two column format, wherein the two column format comprises a first column and a second column;

perform a feature fusion based on the vector of slot type weights and based on the vector of token embeddings to obtain a vector of fused features; and obtain, based on the vector of fused features and using a slot classifier, a vector of classified slots corresponding to the utterance.

15. The non-transitory computer readable medium of claim 14, wherein execution of the program by the one or more processors of the server is configured to cause the server to output the vector of classified slots for fulfillment by a voice-activated artificial intelligence-based personal assistant.

16. The non-transitory computer readable medium of claim 14, wherein execution of the program by the one or more processors of the server is configured to provide information for a debugging engineer to alter the intent classifier and/or the slot classifier based on the vector of slot type weights visualized in the two column format.

17. The non-transitory computer readable medium of claim 14, wherein execution of the program by the one or more processors of the server is configured to visualize the vector of slot type weights by providing a visual presentation including the first column and the second column with bars connecting column entries from the first column to the second column, the first column and the second column both listing the vector of tokens, wherein a first bar corresponds to a correspondence between a first token in the first column with a second token in the second column, thereby permitting a person to recognize focus points on the utterance relevant to the classification by a natural language understanding model.

* * * * *